United States Patent
Shibata et al.

(10) Patent No.: US 9,317,905 B2
(45) Date of Patent: Apr. 19, 2016

(54) DEVICE, METHOD, AND COMPUTER READABLE MEDIUM FOR RESTORING AN IMAGE

(71) Applicants: Takashi Shibata, Tokyo (JP); Akihiko Iketani, Tokyo (JP); Shuji Senda, Tokyo (JP)

(72) Inventors: Takashi Shibata, Tokyo (JP); Akihiko Iketani, Tokyo (JP); Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 20 days.

(21) Appl. No.: 14/364,834

(22) PCT Filed: Dec. 10, 2012

(86) PCT No.: PCT/JP2012/082592
§ 371 (c)(1),
(2) Date: Jun. 12, 2014

(87) PCT Pub. No.: WO2013/089263
PCT Pub. Date: Jun. 20, 2013

(65) Prior Publication Data
US 2014/0334720 A1 Nov. 13, 2014

(30) Foreign Application Priority Data
Dec. 12, 2011 (JP) .................. 2011-271532

(51) Int. Cl.
*G06T 5/00* (2006.01)
*G06T 5/50* (2006.01)
*H04N 19/97* (2014.01)

(52) U.S. Cl.
CPC . *G06T 5/003* (2013.01); *G06T 5/50* (2013.01); *G06T 2207/20081* (2013.01); *G06T 2207/20182* (2013.01); *H04N 19/97* (2014.11)

(58) Field of Classification Search
None
See application file for complete search history.

(56) References Cited

U.S. PATENT DOCUMENTS

| 8,406,571 B2 * | 3/2013 | Weinberger | G06K 9/32 382/274 |
| 2006/0115176 A1 | 6/2006 | Kanamori et al. | |

FOREIGN PATENT DOCUMENTS

| JP | 2007-293912 A | 11/2007 |
| JP | 2008-234479 A | 10/2008 |
| WO | WO-2005/122089 A1 | 12/2005 |

OTHER PUBLICATIONS

International Search Report corresponding to PCT/JP2012/082592 dated Mar. 19, 2013 (3 pages).
Yasunori Taguchi, et al. "A Learning Method of Representative Examples for Image Super-Resolution by Closed-Loop Training," The Journal of the Institute of Electronics, Information and Communication Engineer D, Information System, vol. J92-D No. 6, Jun. 1, 2009, pp. 831-842.

* cited by examiner

*Primary Examiner* — Brian P Werner
(74) *Attorney, Agent, or Firm* — Wilmer Cutler Pickering Hale and Dorr LLP

(57) ABSTRACT

An image processing device, which uses a dictionary which stores data of two or over sets which associate a blurred patch of a blurred image generated by blurring a predetermined image with a restoration patch of the predetermined image. The device includes a processor that processes instructions to generate a tentative restored image from the restoration patch selected based on values indicating similarities between plural input patches generated by dividing an inputted input image and the blurred patch. The processor also processes the instructions to generate a tentative patch by dividing the tentative restored image. The processor further processes the instructions to generate a restored image from the restoration patch selected based on a sum of the value indicating the similarity between the input patch and the blurred patch and a value indicating the similarity between the tentative patch and the restoration patch.

9 Claims, 27 Drawing Sheets

DEVICE, METHOD, AND COMPUTER READABLE MEDIUM FOR RESTORING AN IMAGE

CROSS-REFERENCE TO RELATED APPLICATIONS

The present application is a national stage application of International Application No. PCT/JP2012/082592 entitled "Information Processing Device and Information Processing Method," filed on Dec. 10, 2012, which claims the benefit of priority from Japanese Patent Application No. 2011-271532, filed on Dec. 12, 2011, the disclosures of which are incorporated herein in their entirety by reference thereto.

FIELD OF THE INVENTION

The present invention relates to an image processing device which generates a restored image from a blurred image and an image processing method.

BACKGROUND OF THE INVENTION

A super resolution technology is known as an example of a technology to generate the restored image from the blurred image. A method using a dictionary which learns cases in which a low resolution image is associated with a high resolution image is especially called a learning based super resolution technology in the super resolution technology. One example of the learning based super resolution technology is described in non-patent document 1.

The learning based super resolution technology described in non-patent document 1 performs the following method (hereinafter, referred to as "super-resolution process").

Namely, the super-resolution process receives an input image which is a low resolution image.

Next, the super-resolution process increases the number of pixels of the input image by an interpolation method and generates a temporary high resolution image.

Further, the super-resolution process generates a low frequency component from one increasing the number of pixels of the input image.

The super-resolution process cuts out a low frequency patch from the generated low frequency component and calculates a low frequency feature quantity from the low frequency patch.

The super-resolution process searches a predetermined number of low frequency feature quantities from a dictionary in order of increasing distance from the calculated low frequency feature quantity, and reads the high frequency feature quantity paired with the searched low frequency feature quantity.

Then, the super-resolution process selects one high frequency feature quantity on the basis of the distance at the time of the search, a consistency with an adjacent high frequency block, a co-occurrence probability of the low frequency feature quantity and the high frequency feature quantity separately learned at a learning stage, or the like.

The technology described in non-patent document 1 reduces a memory amount and suppresses a calculation cost by using a dictionary structure with one-to-many relation in which the low frequency feature quantities that are mutually similar to each other are aggregated to one representative.

[Non-patent document 1] Yasunori Taguchi, Toshiyuki Ono, Takeshi Mita, Takashi Ida, "A Learning Method of Representative Examples for Image Super-Resolution by Closed-Loop Training", The journal of the Institute of Electronics, Information and Communication Engineer D, Information System, Vol. J92-D No. 6, pp. 831-842, Jun. 1, 2009.

SUMMARY OF THE INVENTION

Problems to be Solved by the Invention

However, the technology described in non-patent document 1 has a problem in which restorative accuracy of the high resolution image is not good necessarily.

The reason is because there is a case in which the technology described in non-patent document 1 erroneously selects a high resolution patch because of selecting a high resolution patch on the basis of only a similarity of a low resolution patch between the input image and learning data.

For this problem, a technology which selects the patch by considering an adjacent similarity of the high resolution patch in addition to the similarity of the low resolution patch can be considered. However, this technology has a problem in which the calculation cost increases.

An object of the present invention is to provide an image processing device which solves the above-mentioned problem and an image processing method.

Means for Solving the Problem

In order to archive above-mentioned object, an image processing device according to the present invention, which uses a dictionary which stores data of two or over sets which associate a blurred patch which is a patch of a blurred image generated by blurring a predetermined image with a restoration patch which is a patch of the predetermined image; includes: a tentative restored image generation unit which generates a tentative restored image from the restoration patch selected based on values indicating similarities between plural input patches generated by dividing an inputted input image and the blurred patch; tentative patch generation unit which generates a tentative patch by dividing the tentative restored image; and restoration unit which generates a restored image from the restoration patch selected based on a sum of the value indicating the similarity between the input patch and the blurred patch and a value indicating the similarity between the tentative patch and the restoration patch.

And, in order to archive above-mentioned purpose, a computer readable medium embodying a program, said program causing an image processing device to perform a method, said method includes: storing data of two or over sets which associates a blurred patch which is a patch generated by blurring a predetermined image with a restoration patch which is a patch of the predetermined image; generating a tentative restored image from the restoration patch selected based on values indicating a similarities between plural input patches generated by dividing an inputted input image and the blurred patch; generating a tentative patch by dividing the tentative restored image; and generating a restored image from the restoration patch selected based on a sum of the value indicating the similarity between the input patch and the blurred patch and a value indicating the similarity between the tentative patch and the restoration patch.

And, in order to archive above-mentioned object, a program causing a computer to execute processes, said processes includes: storing data of two or over sets which associates a blurred patch which is a patch generated by blurring a predetermined image with a restoration patch which is a patch of the predetermined image; generating a tentative restored image from the restoration patch selected based on values indicating a similarities between plural input patches generated by dividing an inputted input image and the blurred patch; generating a tentative patch by dividing the tentative restored image; and generating a restored image from the restoration patch selected based on a sum of the value indicating the similarity between the input patch and the blurred patch and a value indicating the similarity between the tentative patch and the restoration patch Effect of the Invention According to the image processing device of the present invention, the highly accurate restored image can be generated with reducing the calculation cost.

EXEMPLARY EMBODIMENT OF THE INVENTION

Figure 1:
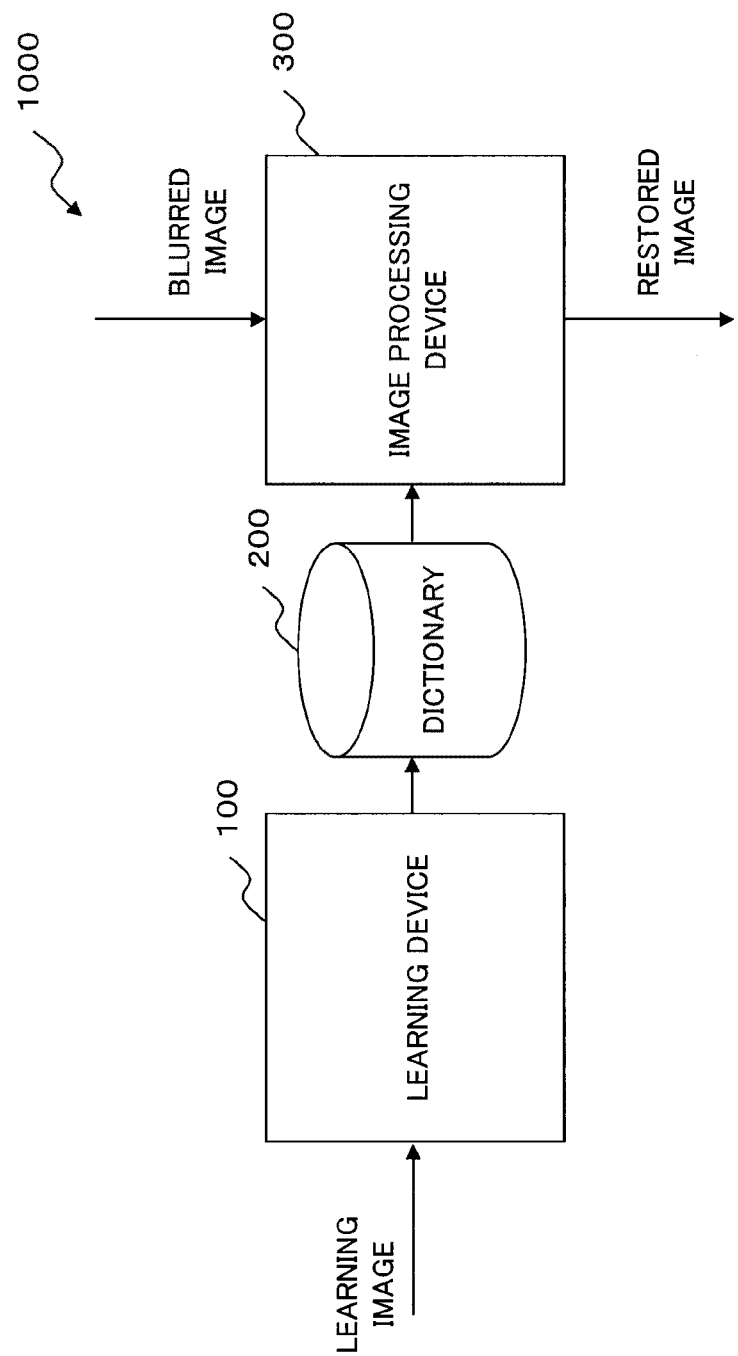
FIG. 1 is a block diagram showing an example of a configuration of an image processing system according to a first exemplary embodiment of the present invention.

Next, exemplary embodiments according to the present invention will be described in detail with reference to a drawing.

First, for ease of understanding of the exemplary embodiments of the present invention, the background of the present invention will be described. In addition, in the following explanation, although the super-resolution technology is taken as an example, the present invention is not limited to the super-resolution technology. The present invention can be applied to, for example, a noise removal technology, an image correction technology, a time resolution interpolating technology, a blur removal technology and all technologies for generating a restored image from an input image with a poor quality.

The learning based super resolution technology includes a learning phase and a restoration phase.

The "learning phase" is a phase for learning plural cases and creating a dictionary which includes a patch pair in each case as dictionary data.

The "restoration phase" is a phase for searching from the dictionary created in the learning phase, the most suitable patch corresponding to a patch on input image (hereinafter, referred to as an input patch) which is an object of image processing, and generating the super-resolution image (the restored image) by using a composition process. Here, generally, the input image is a poor quality image which is low resolution, is mixed with noise, is partially destroyed, or is partially lost.

Here, the "patch pair" is a pair with a patch of a high resolution image and a patch of a low resolution image in a predetermined case. The high resolution image (hereinafter, referred to as a "learning image") is the image corresponding to the case. The low resolution image (hereinafter, referred to as a "blurred image") is an image which is generated by blurring the high resolution image. Hereinafter, the patch of the learning image (the high resolution image) is called a "restoration patch", and the patch of the blurred image (the low resolution image) is called a "blurred patch".

And, the "patch" is a small area image which is a partial image of the object. For example, the patch is one (small area image) generated by dividing the image of the object into blocks.

As a technology related to the present invention, for example, the technology described in non-patent document 1 searches a blurred patch which is most similar to the patch generated from the input image which is the object of the super-resolution process among plural blurred patches stored in the dictionary. The technology described in non-patent document 1 generates the super-resolution image by selecting a restoration patch which is paired with the searched blurred patch and composing plural restoration patches which are selected.

As the technology described in non-patent document 1, when the restoration patch is selected on the basis of only the similarity between the blurred patches of the input image and the patch pair in the super-resolution process, an erroneous selection of the restoration patch occurs easily.

The reason is because when the similarity between the patches is judged in the super-resolution process, it may occur that a low resolution level is similar but a high resolution lever is not similar. For this reason, even if a more similar patch to be paired exists in the high resolution level, a problem in which another patch for the pair is selected occurs by considering only a similarity of low resolution level.

For this problem, there is a method of selecting patch by considering the adjacent similarity of the restoration patch in addition to the similarity of the blurred patch. Based on this method, a risk of occurrence of erroneous selection is reduced. But this method causes a problem in which a calculation cost increases.

Figure 26:
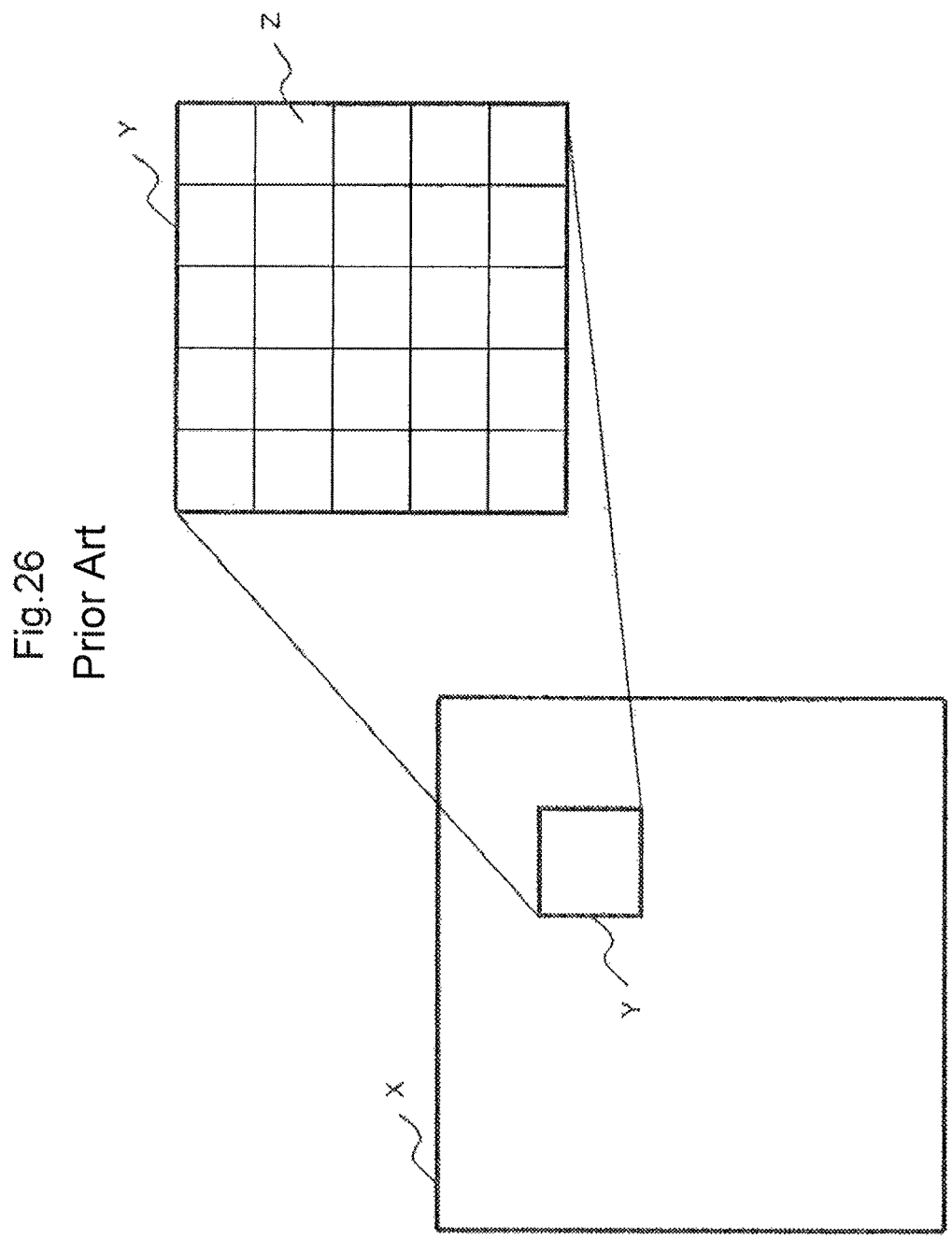
FIG. 26 is a figure for explaining a relation between an image X and patches Y.
Figure 27:
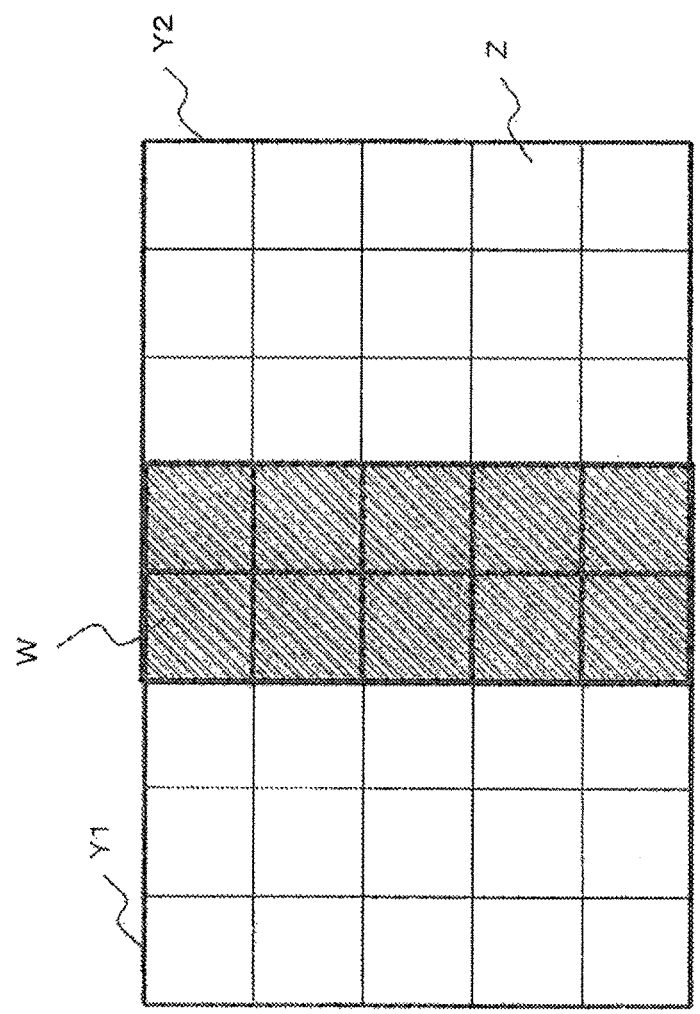
FIG. 27 is a figure for explaining an overlap area W of the adjacent restoration patches Y.

FIG. 26 and FIG. 27 are figures for explaining the increase of calculation cost when considering the adjacent similarity of the restoration patch.

FIG. 26 is a figure for explaining a relation between an image X and patches Y.

As shown in FIG. 26, the patch Y is the small area image of one certain image X. As shown in FIG. 26, for example, the patches Y are respectively constructed by 25 pixels Z of 5 pixels length times 5 pixels width. Here, for example, the patch Y is the restoration patch.

FIG. 27 is a figure for explaining an overlap area W of the adjacent restoration patches Y.

As shown in FIG. 27, the restoration patch Y1 and the restoration patch Y2 which is adjacent patch to Y1 are adjacent with partially overlap each other. When a difference between the pixel values in the overlap area W is small, it can be said that two patches are adjacent to each other smoothly.

Here, it is temporarily assumed that K pairs of the blurred patch and the restoration patch are stored in the dictionary for storing learning data. In this case, because the number of the patterns of the restoration patch Y1 is K and the number of the patterns of the adjacent restoration patch Y2 is K, the number of calculations of the adjacent similarity for the restoration patch is calculation of the large number of the patterns as total "K×K" patterns. For this reason, it makes cost huge and is not realistic that the adjacent similarity of the restoration patch is calculated for all the patterns.

An exemplary embodiment of the present invention described below can generate a highly accurate restored image with reducing calculation cost because it can acquire similar effect in case considering the adjacent similarity of the restoration patch in addition to the similarity of the blurred patch.

In addition, in FIG. 26 and FIG. 27, though an example in which one patch is constructed by 25 pixels and an adjacent patch is arranged with shifted 3 pixels is shown, this example is not limited the scope of the present invention. The patch of the present invention may be constructed by 36 pixels of 6 times 6 pixels, or not only this but it may be constructed of optional number of pixels. And, the adjacent patch of the present invention may be arranged with shifted 1 pixel, or not only this but it may be arranged with sifted optional number.

<First Exemplary Embodiment>

FIG. 1 is a block diagram showing an example of a configuration of an image processing system 1000 according to a first exemplary embodiment of the present invention.

As shown in FIG. 1, the image processing system 1000 according to the first exemplary embodiment includes a learning device 100, a dictionary 200, and an image processing device 300.

The learning device 100 receives a learning image and performs the learning phase.

The dictionary 200 stores patch pairs generated in the learning phase.

The image processing device 300 receives the input image, performs the restoration phase by using the dictionary 200, and outputs the restored image.

Hereinafter, the first exemplary embodiment will be described by dividing the learning phase and the restoration phase performed.

(Learning Phase)

The learning phase according to the first exemplary embodiment of the present invention will be described with reference to FIGS. 2 to 5.

Figure 2:
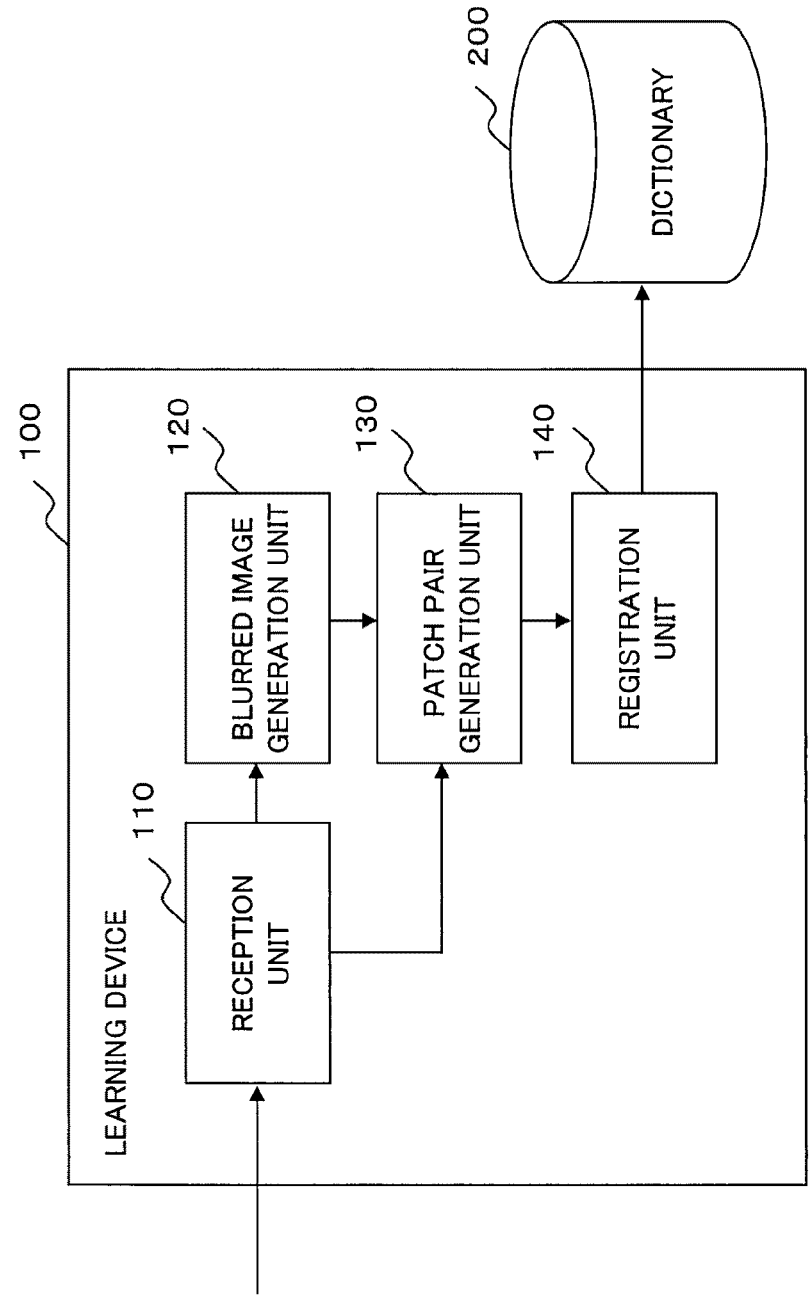
FIG. 2 is a block diagram showing an example of a configuration of a learning device according to the first exemplary embodiment.

FIG. 2 is a block diagram showing an example of a configuration of the learning device 100.

As shown in FIG. 2, the learning device 100 includes a reception unit 110, a blurred image generation unit 120, a patch pair generation unit 130 and a registration unit 140.

The learning device 100 performs the learning phase and makes the dictionary 200.

The reception unit 110 receives the learning image from outside. The reception unit 110 outputs the learning image received from the outside to the blurred image generation unit 120 and the patch pair generation unit 130.

The blurred image generation unit 120 performs a blurring process to the learning image outputted from the reception unit 110, and generates the blurred image.

The blurred image generation unit 120 may perform plural blurring processes to the learning image outputted from the reception unit 110, and generate plural blurred images.

The blurred image generation unit 120 may perform plural different blurring processes to the learning image, and generate plural blurred images.

The blurred image generation unit 120 may generate the blurred image by using at least one among a size reduction process, a lightness reducing process, a high frequency component eliminating process, and a posture changing process to the learning image outputted from the reception unit 110.

The blurred image generation unit 120 may reduce the size of the learning image received from the reception unit 110, for example, to one N-th of its size, and generate the blurred image ("N" is a predetermined natural number). For example, an algorithm for reducing the size of the image may use the nearest neighbor method which has relatively large image quality degradation. Alternatively, for example, an algorithm for reducing the size of the image may use a bilinear method or a bicubic method.

For example, the blurred image generation unit 120 may eliminate the high frequency component of the learning image, increase a degree of blur, and generate the blurred image.

For example, the blurred image generation unit 120 may change the posture of the learning image by tilting it, and generate the blurred image.

The blurred image generation unit 120 may decrease the lightness by decreasing the brightness value of the learning image, and generate the blurred image.

The blurred image generation unit 120 may generate the blurred image by using the various conventional methods.

The blurred image generation unit 120 outputs the blurred image generated from the learning image to the patch pair generation unit 130.

The patch pair generation unit 130 receives the learning image from the reception unit 110, and receives the blurred image of the learning image from the blurred image generation unit 120. The patch pair generation unit 130 generates plural patch pairs at a position where the learning image and the blurred image correspond.

The patch pair generation unit 130 may generate plural pairs ("patch pairs") of the restoration patches and the blurred patches by using a conventional method.

The patch pair generation unit 130 outputs plural generated patch pairs to the registration unit 140.

In addition, the reception unit 110 of the learning device 100 may receive both the learning image and the blurred image which is paired with the learning image from outside.

For example, the learning device 100 may generate the image taken by a camera which can take a high resolution image as the learning image, and generate the image taken by a low performance camera as the blurred image.

Alternatively, the blurred image may be an image taken under an out-of-focus condition intentionally or an image taken with setting an exposure time to improper. Alternatively, the blurred image may be an image taken with shaking a camera. The blurred image may be an image taken under other bad conditions When receiving the blurred image from outside, the learning device 100 may not include the blurred image generation unit 120. In this case, the patch pair generation unit 130 receives the learning image and the blurred image from the reception unit 110.

The registration unit 140 is supplied plural patch pairs from the patch pair generation unit 130. The registration unit 140 registers the plural patch pairs in the dictionary 200.

The dictionary 200 stores the plural patch pairs generated by the learning device 100.

Figure 3:
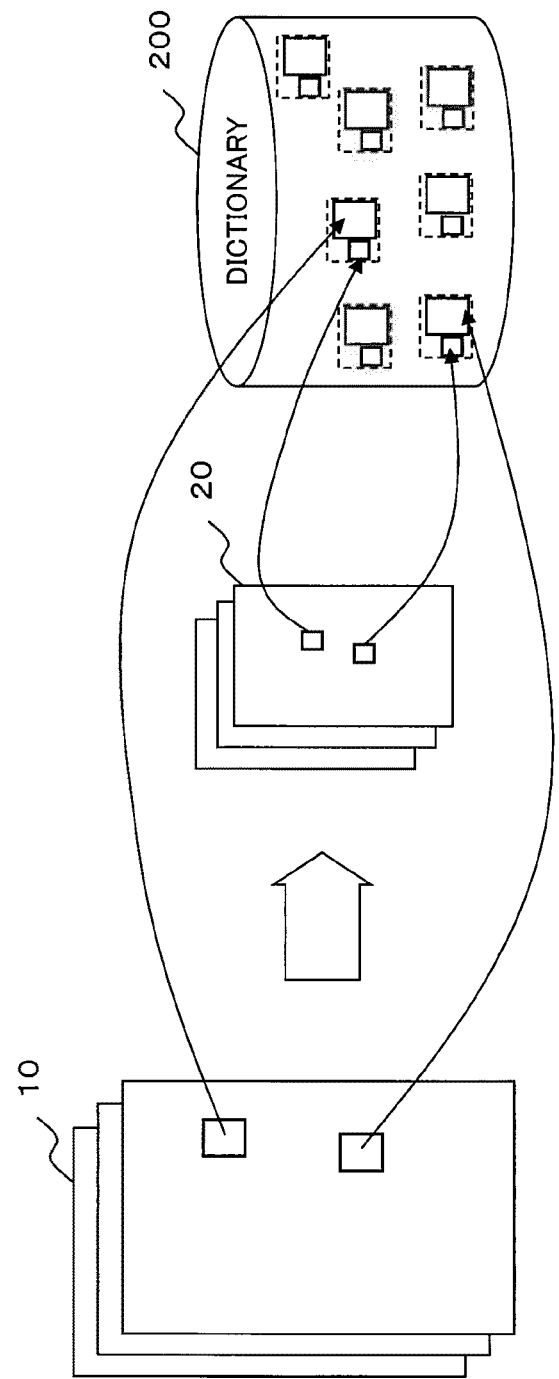
FIG. 3 is a conceptual diagram for explaining a learning phase according to the first exemplary embodiment.

FIG. 3 is a conceptual diagram for explaining the learning phase according to the first exemplary embodiment.

As shown in FIG. 3, the learning device 100 registers the patch pair at a position where a learning image 10 and a blurred image 20 correspond in the dictionary 200.

Figure 4:
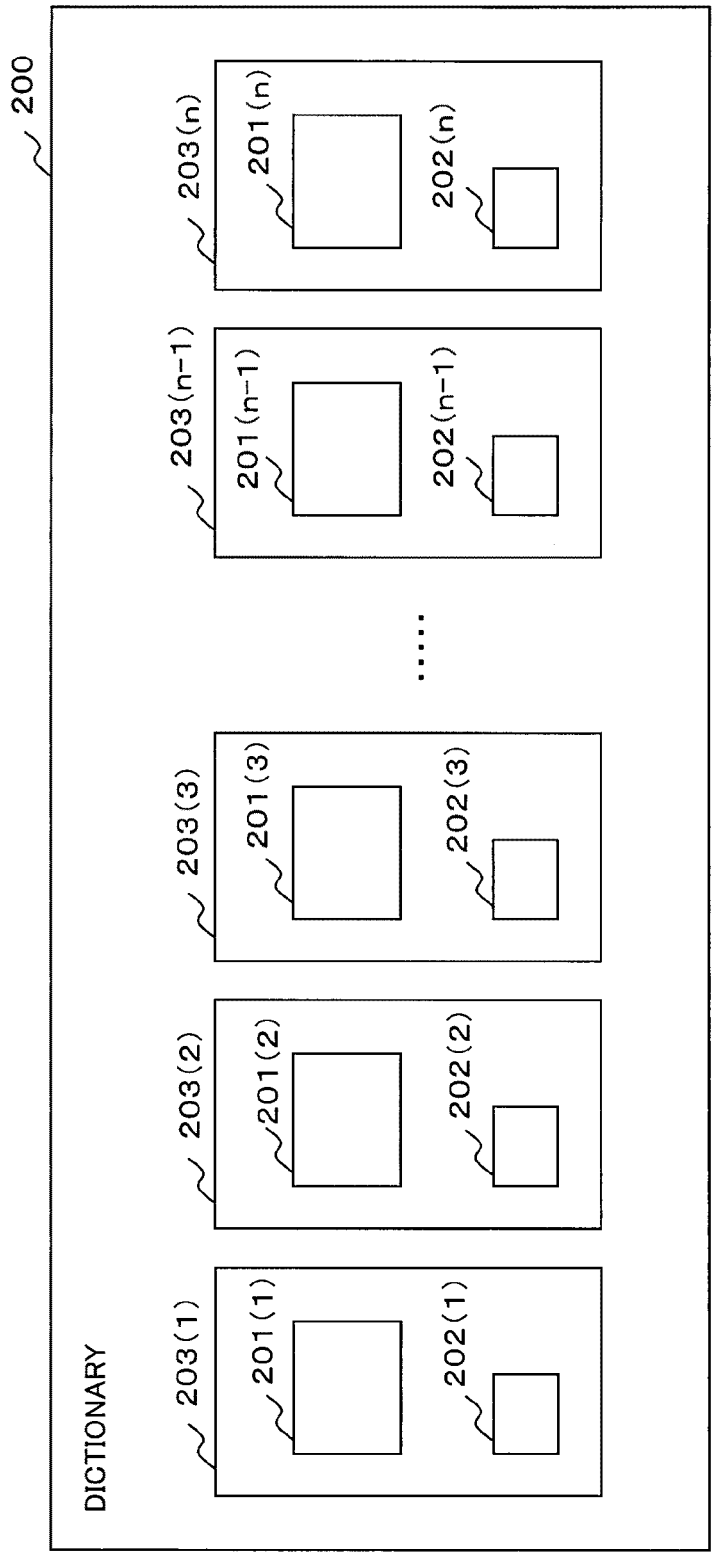
FIG. 4 is a conceptual diagram for explaining a state in which a dictionary according to the first exemplary embodiment stores a patch pair.

FIG. 4 is a conceptual diagram for explaining a state in which the dictionary 200 stores the patch pair.

As shown in FIG. 4, the dictionary 200 stores restoration patches 201(1), 201(2), 201(3), . . . , 201(n−1), and 201(n). And, the dictionary 200 stores the blurred patches 202(1), 202(2), 202(3), . . . , 202(n−1), and 202(n) corresponding to the restoration patch 201. Namely, the dictionary 200 stores the patch pairs 203(1), 203(2), 203(3), . . . , 203(n−1), and 203(n) which are the pairs of the restoration patch 201 and the blurred patch 202. Here, n is a natural number.

A method for storing the patch pair in the dictionary 200 is not limited to a method which stores each patch associated with as shown in FIG. 4. For example, the dictionary 200 may store the restored image as not patch but one image, and store an index that indicates which area of the restored image associates with each blurred patch as the learning data. Alternatively, the dictionary 200 may store the patch pair by using other method. In this case, the structure of the patch may be compatible with the method for storing the patch pair in the dictionary 200.

Next, the operation of the learning device 100 will be described with reference to the drawing.

Figure 5:
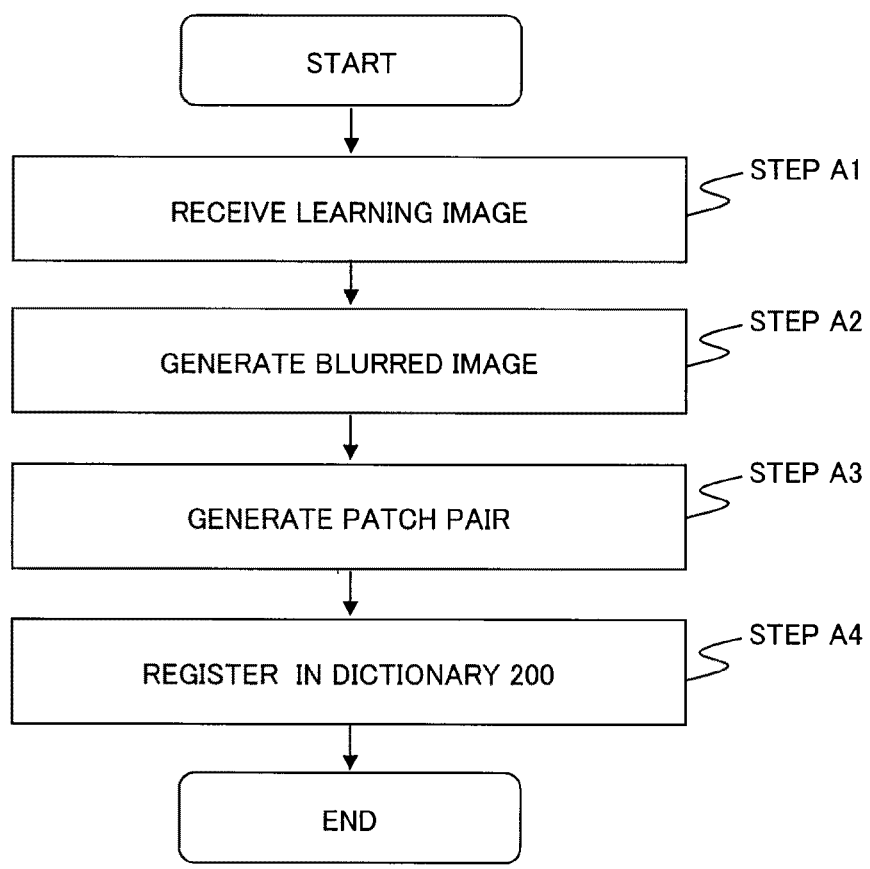
FIG. 5 is a flowchart showing an example of operation of the learning device according to the first exemplary embodiment.

FIG. 5 is a flowchart showing an example of the operation of the learning device 100.

The reception unit 110 receives the learning image from outside (Step A1).

The blurred image generation unit 120, for example, reduces the learning image outputted from the reception unit 110 to one N-th of its size, and generates the blurred image (Step A2).

The patch pair generation unit 130 generates the patch pair at a position where the learning image and the blurred image correspond, and outputs it to the registration unit 140 (Step A3).

The registration unit 140 registers the patch pair in the dictionary 200 (Step A4).

The above is the explanation of the operation of the learning device 100 which creates the dictionary 200.

(Restoration Phase)

The restoration phase according to the first exemplary embodiment will be described with reference to FIGS. 6 to 10.

Figure 6:
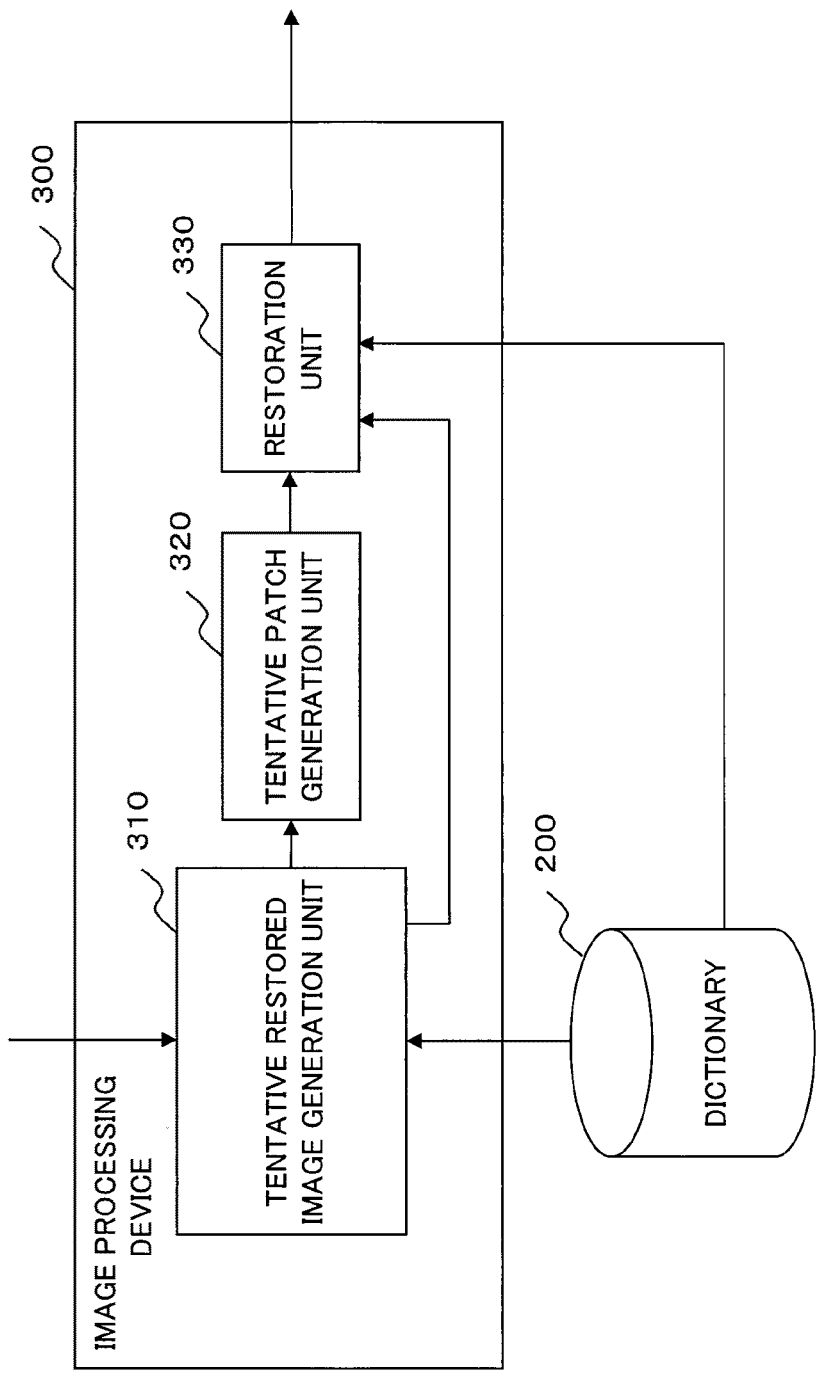
FIG. 6 is a block diagram showing an example of a configuration of an image processing device according to the first exemplary embodiment.

FIG. 6 is a block diagram showing an example of a configuration of the image processing device 300.

As shown in FIG. 6, the image processing device 300 includes a tentative restored image generation unit 310, a tentative patch generation unit 320, and a restoration unit 330. The image processing device 300 performs the restoration phase by using the dictionary 200.

Figure 7:
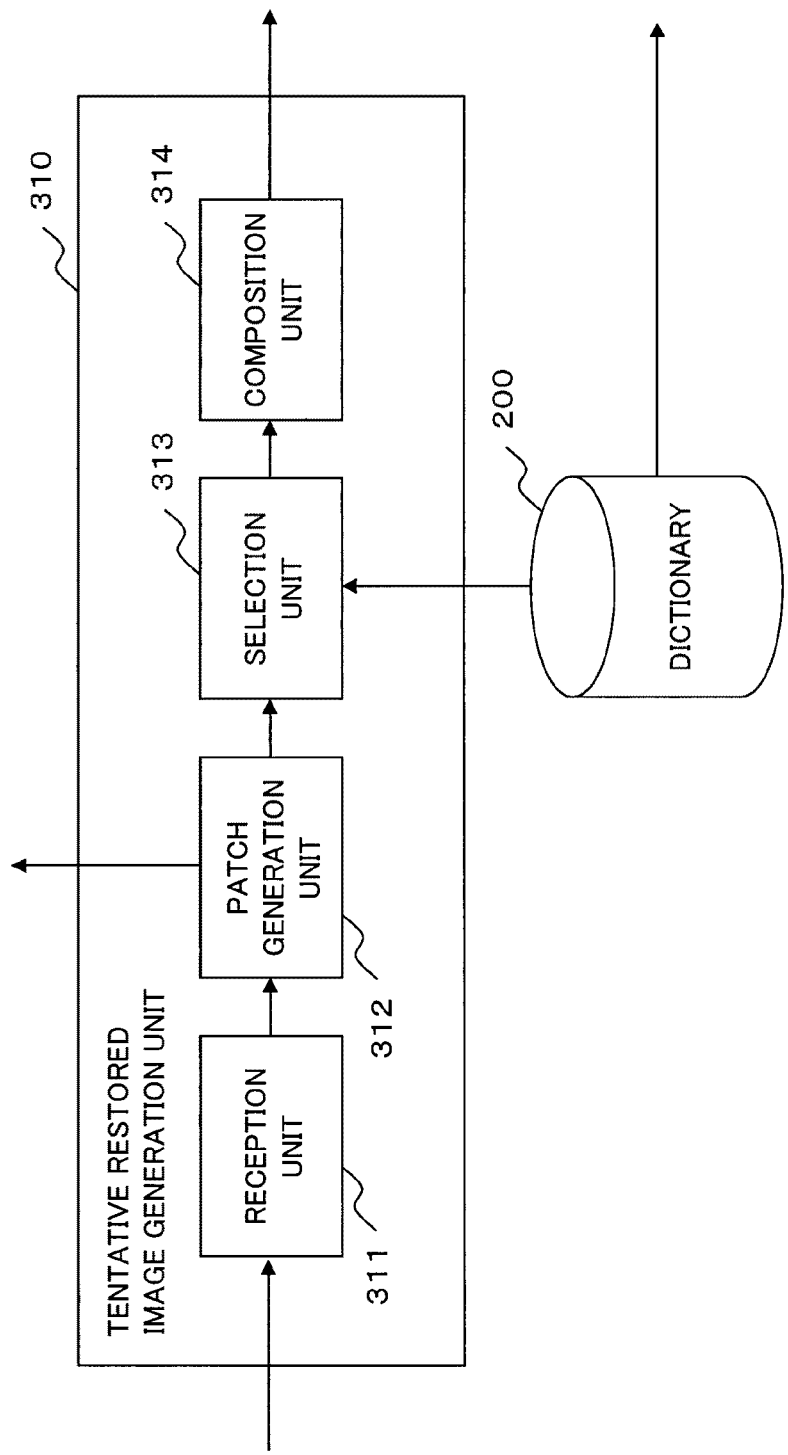
FIG. 7 is a block diagram showing an example of a detailed configuration of a tentative restored image generation unit according to the first exemplary embodiment.

FIG. 7 is a block diagram showing an example of a detailed configuration of the tentative restored image generation unit 310.

As shown in FIG. 7, the tentative restored image generation unit 310 includes a reception unit 311, a patch generation unit 312, a selection unit 313, and a composition unit 314.

The tentative restored image generation unit 310 receives the input image which is an object of the image processing from outside, performs the image processing of the input image, and generates a tentative restored image (hereinafter, referred to as a "tentative restored image"). Specifically, the tentative restored image generation unit 310 selects the restoration patch based on the similarities between plural patches (the input patches) generated by dividing the input image into blocks and the blurred patch stored in the dictionary 200. Next, the tentative restored image generation unit 310 composes the plural selected restoration patches, and generates the tentative restored image. The detailed explanation about the similarity between the input patch and the blurred patch will be described later.

The reception unit 311 receives the input image which is the object of the image processing from outside. The reception unit 311 may connect to a network and receive the input image, may read the input image from a memory storing the input image and receive the input image, and is not limited about receiving figure. The reception unit 311 outputs the received input image to the patch generation unit 312.

The patch generation unit 312 divides the input image outputted from the reception unit 311 into blocks, and generates plural patches (the input patches). The patch generation unit 312 outputs the generated plural input patches to the selection unit 313. And, the patch generation unit 312 outputs the generated plural input patches to the restoration unit 330 shown in FIG. 6. The operation of the restoration unit 330 will be described later.

The selection unit 313 is supplied plural patches from the patch generation unit 312. The selection unit 313 selects the restoration patch for each input patch from among the patch pairs stored in the dictionary 200 based on a value (hereinafter, referred to as a "blur similarity value") which indicates the similarity between the input patch and the blurred patch in the dictionary 200. The selection unit 313 outputs the selected restoration patch to the composition unit 314. Details of the similarity between two patches will be described in the explanation for FIG. 9 later.

The composition unit 314 composes the restoration patches outputted from the selection unit 313, and generates the tentative restored image.

The configuration of the image processing device 300 shown in FIG. 6 will be described further.

The tentative restored image generation unit 310 outputs the generated tentative restored image to the tentative patch generation unit 320.

The tentative patch generation unit 320 divides the tentative restored image outputted from the tentative restored image generation unit 310 into blocks, and generates plural patches. The tentative patch generation unit 320 outputs the patches (hereinafter, referred to as a "tentative patch") generated from the tentative restored image to the restoration unit 330.

The restoration unit 330 is supplied the tentative patches from the tentative patch generation unit 320. The restoration unit 330 newly selects the restoration patch again by considering a value (hereinafter, referred to as a "restoration similarity value") which indicates the similarity between the tentative patch and the restoration patch in the dictionary 200 in addition to the blur similarity value. Namely, the restoration unit 330 newly selects the restoration patch again based on a value which composes the blur similarity value and the restoration similarity value, and updates the tentative restored image by using the restoration patch selected again. As the value integrating the blur similarity value and the restoration similarity value, for example, the restoration unit 330 may use a sum of these values, an integrated value of these values, or the like.

The restoration unit 330 repeats the update of the tentative restored image based on the sum of the blur similarity value and the restoration similarity value, and outputs the tentative restored image to the outside as the restored image when the update of the tentative restored image does not disappear. In addition, the restoration unit 330 may output the tentative restored image to the outside as the restored image after predetermined number of the update rather than may repeat the update of the tentative restored image based on the sum of the blur similarity value and the restoration similarity value until the update of the tentative restored image does disappear. The number of repeating times of update may be set to a fixed number in advance or may be set based on a user's input.

Figure 8:
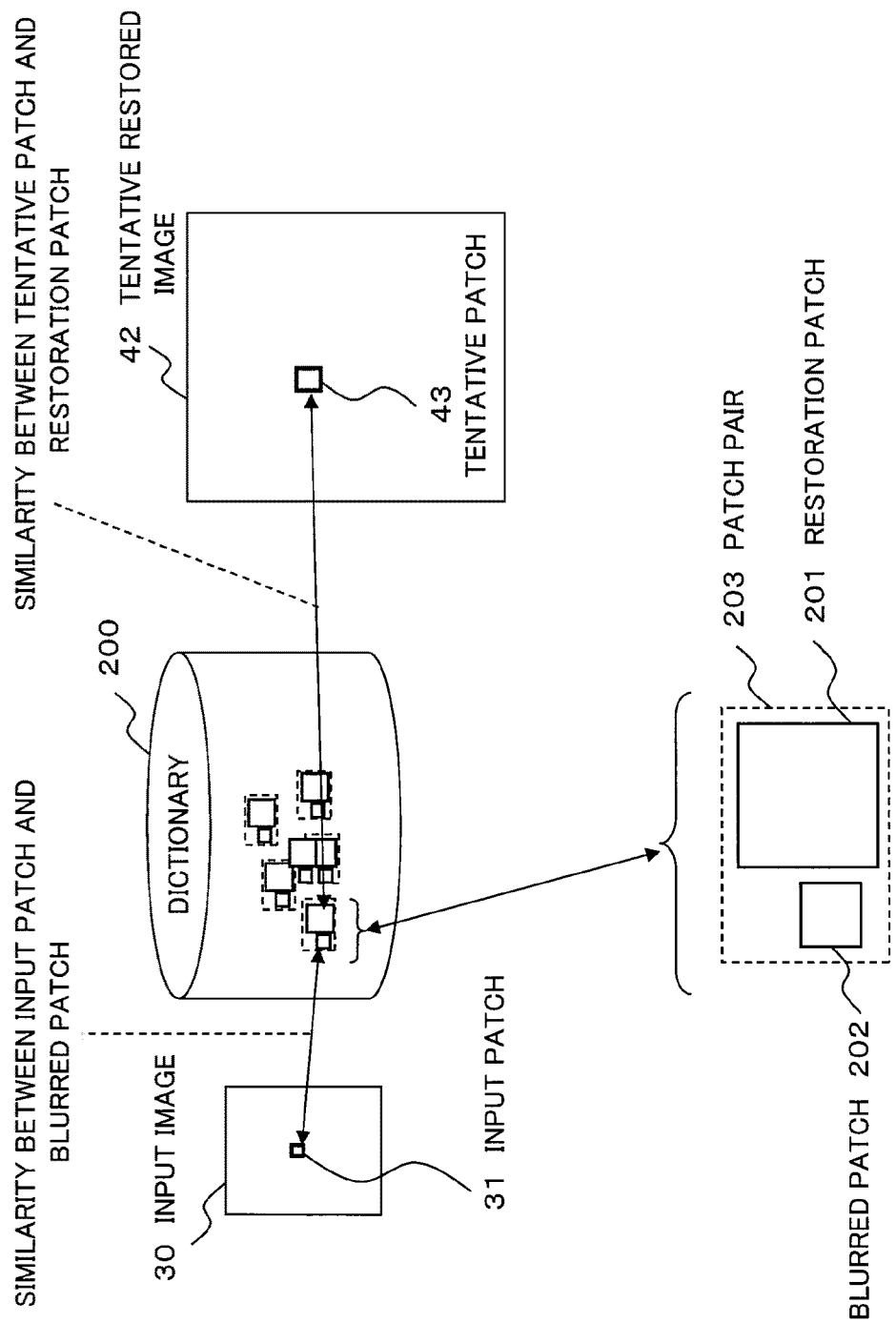
FIG. 8 is a conceptual diagram for explaining a restoration phase according to the first exemplary embodiment.

FIG. 8 is a conceptual diagram for explaining the restoration phase.

As shown in FIG. 8, the image processing device 300 selects a restoration patch 201 by considering the similarity between the input patch 31 of the input image 30 and the blurred patch 202 in the dictionary 200 and the similarity between the tentative patch 43 of the tentative restored image 42 and the restoration patch 201 in the dictionary 200.

Next, the similarity between two patches (for example, the input patch and the blurred patch) will be described.

Figure 9:
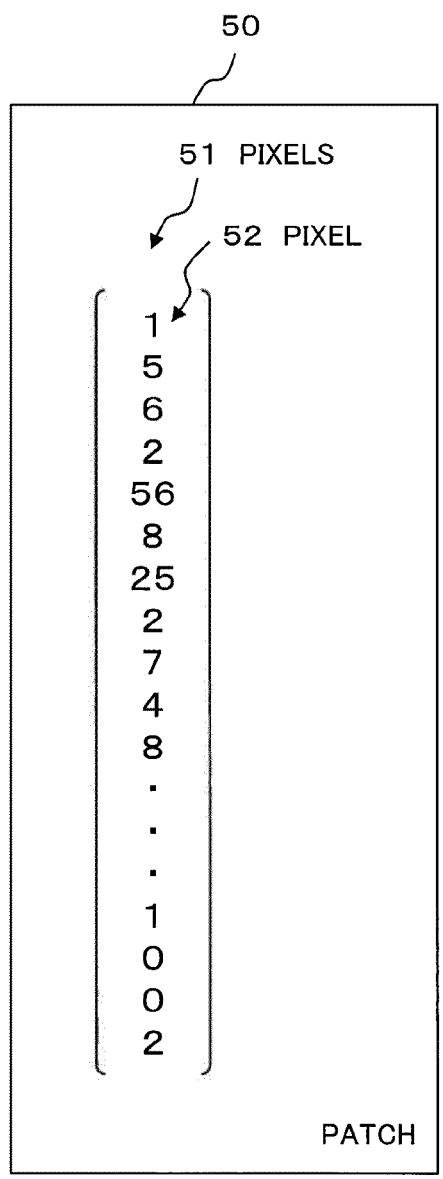
FIG. 9 is a figure showing an example of a patch according to the first exemplary embodiment.

FIG. 9 is a figure showing an example of a patch 50.

As shown in FIG. 9, for example, the patch 50 includes pixels 51 which has the pixel values of plural pixels 52 as elements and is a multi-dimensional vector. In addition, the patch 50 is a concept including the restoration patch, the blurred patch, the input patch and the tentative patch.

And, the pixel value may be a brightness value, or is not limited to this value.

In case of the brightness value, the value indicating the similarity between two patches may be a value based on the difference of the brightness values of the pixels between two patches. For example, the value indicating the similarity between two patches may be a value based on a SSD (Sum of Square Distance) which is a sum of squares of the difference of the brightness values of the pixels between the patches. Alternatively, the value indicating the similarity between two patches may be a value based on a SAD (Sum of Absolute Distance) which is a sum of absolute value of the difference of the brightness values of the pixels between two patches.

Besides, for example, the value indicating the similarity between two patches may be a value based on an angle between two feature vectors.

Alternatively, the value indicating the similarity between two patches may be a value calculated by using a normalized cross-correlation function. Alternatively, the similarity may be a value calculated based on a brightness gradient of the patch. Alternatively, the similarity may be used a value calculated from a distance of the histogram after making a value of the brightness or a value of the brightness gradient a histogram.

However, the value indicating the similarity between two patches is not limited to these values.

Namely, the similarity between two patches is the similarity between the images represented by the respective pixels of two patches.

For example, when the value indicating the similarity between two patches is a value subtracting the SSD or the SAD of the brightness value from a specific constant, the sum of the blur similarity value and the restoration similarity value mentioned above is a value subtracting the sum of the SSD value or the SAD value of the brightness value between the patches which are the input patch and the blurred patch and the SSD value or the SAD value of the brightness value between the patches which are the tentative patch and the restoration patch from a value which is twice the above-mentioned specific constant. The restoration unit 330 newly selects the restoration patch whose value is maximum (namely, the above-mentioned sum of the SSD value or the sum of the SAD value is minimum) from the dictionary 200 again. Then, the restoration unit 330 updates the tentative restored image by using the restoration patch which is newly selected for each tentative patch.

Next, the operation of the image processing device 300 will be described in detail with reference to the drawing.

Figure 10:
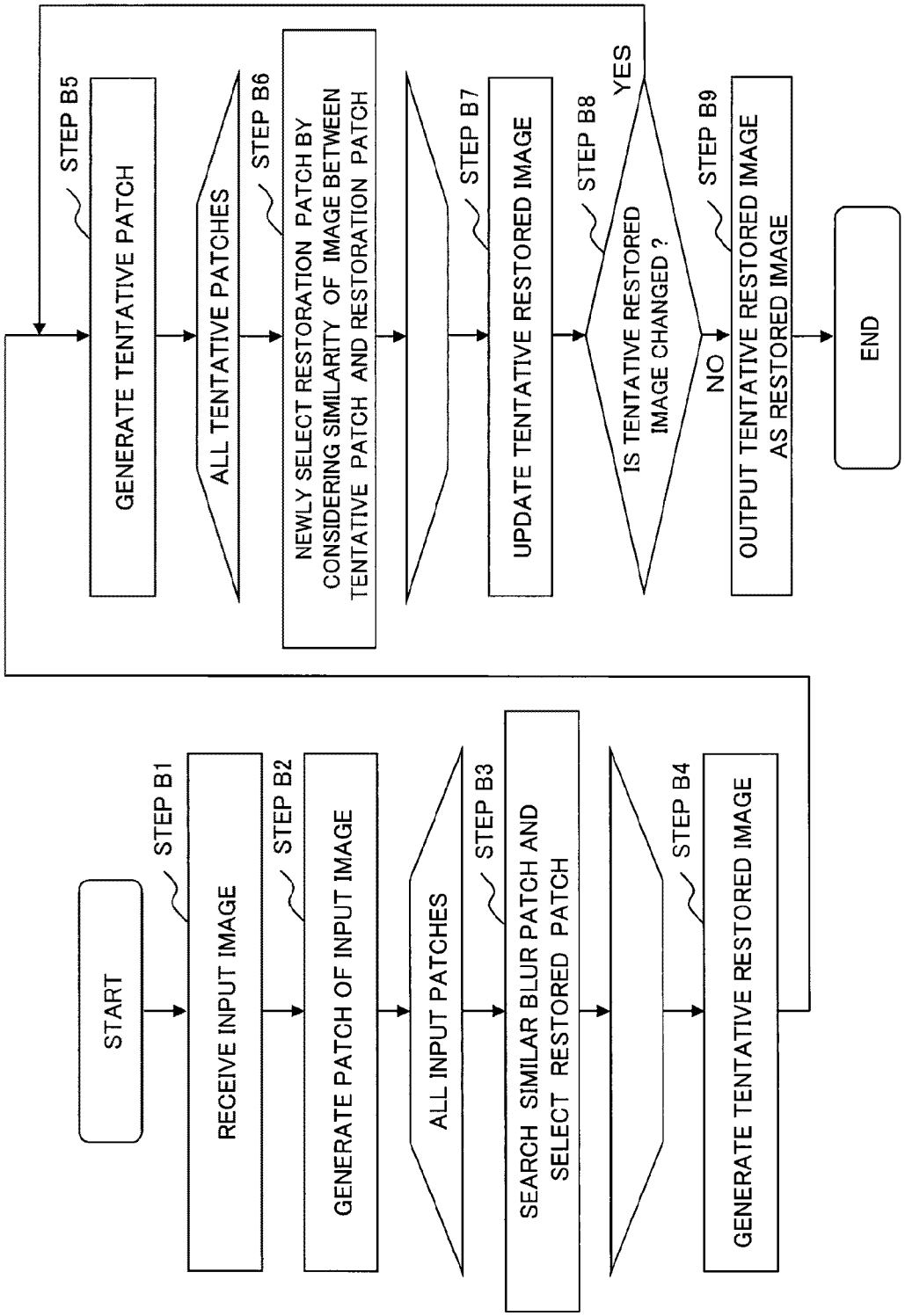
FIG. 10 is a flowchart showing an example of operation of the image processing device.

FIG. 10 is a flowchart showing an example of the operation of the image processing device 300.

The reception unit 311 receives the input image which is an object of the image processing from outside (Step B1).

The patch generation unit 312 divides the input image outputted from the reception unit 311 into blocks, and generates plural patches (input patches) (Step B2). For example, the patch generation unit 312 may use an area constructed of 25 pixels of 5 pixels length times 5 pixels width as a patch unit of the input patch. In this case, the patch generation unit 312 may generate the input patch by such relation in which an adjacent patch shifts 1 pixel to the input image. In addition, the number of pixels of area of the patch or the relation of adjacent patch is not limited to these. For example, the patch generation unit 312 may generate the input patch as a patch which has a relation in which an adjacent patch shifts 3 pixels. In addition, as the number of sifted pixel between the input image and the adjacent patch of it is smaller (the overlap area between it and the adjacent patches of it is larger), the image processing device 300 can perform the more accurate composition process for generating the restored image.

The selection unit 313 searches the blurred patch which is the most similar to the input patch based on the blur similarity value between the input patch and the blurred patch in the dictionary 200, and selects the restoration patch which is paired with the most similar blurred patch (Step B3). For example, the selection unit 313 may search the blurred patch of which a value acquired by subtracting the above-mentioned SSD value or the SAD value from the specific constant is maximum value to the input patch from the dictionary 200, select the restoration patch corresponding to the blurred patch which is searched, and output it. The image processing device 300 repeats Step B3 for all the input patches generated from the input image.

In addition, in the above-mentioned explanation for Step B3, although it is assumed that the blurred patch which is most similar to the input patch is searched, the operation of Step B3 is not limited to this operation. For example, the selection unit 313 may compose plural restoration patches in order of similarity from the most similar patch, and generate the new restoration patch. In addition, a process for "composing the images (patches)" may be a process for "calculating an average of the pixel values of all the images (patches) which are objects of composition".

Next, the composition unit 314 composes the plural restoration patches outputted by the selection unit 313, and generates the tentative restored image (Step B4). Here, the "composition" may be a process for calculating an average of the pixel values as mentioned above. Specifically, the "composition" may be a process for calculating an average of the pixel values of all the overlapped restoration patches about the overlap area when all the restoration patches are arranged at the positions which are relatively same positions of the input patches corresponding to each.

The tentative patch generation unit 320 divides the tentative restored image outputted from the tentative restored image generation unit 310 into blocks, and generates the plural tentative patches (Step B5). The tentative patch generation unit 320 may generate the tentative patch according to a ratio of the size of the input image to the size of the tentative restored image. For example, a case in which the input patch is generated with relation shifted 1 pixel from the adjacent patch and the size of the tentative restored image is five times of the size of the input image is assumed. In this case, the tentative patch may be generated with relation shifted 5 pixels from adjacent patch.

The restoration unit 330 newly selects the restoration patch from the dictionary 200 again based on the sum of the blur similarity value and the restoration similarity value (Step B6). In functionally other words, after the restoration unit 330 considers the restoration similarity value to the tentative restored image generated by the restoration similarity value again, it selects the restoration patch which is considered more appropriate as the restored image again. The restoration unit 330 repeats the process of Step B6 to all the tentative patches. In addition, the restoration unit 330 does not update with the area where the same restoration patch is selected by considering the restoration similarity value.

The restoration unit 330 newly selects the restoration patch again, and generates (updates) the tentative restored image by using the restoration patch which is newly selected (Step B7). The restoration unit 330 may update the tentative restored image by newly selecting the restoration patch again to all the tentative patches and performing the composition process finally. Alternatively, the restoration unit 330 may update the tentative restored image by using a local method by which the restoration patch is replaced whenever the restoration patch is newly selected again to one tentative patch.

The restoration unit 330 judges whether or not the tentative restored image is changed based on the process for newly selecting the restoration patch from the tentative patch (Step B8).

When judging that the change is performed (YES in Step B8), the restoration unit 330 newly generates the tentative patch, and repeats the process for updating the tentative restored image (Step B5, Step B6, Step B7, and Step B8).

In addition, the restoration unit 330 may judge the number of update times of the tentative restored image based on the process for newly selecting the restoration patch from the tentative patch (Step B8). Then, when the number of update times is equal to or less than a predetermined number of times, the restoration unit 330 may newly generate the tentative patch and repeat the process for updating the tentative restored image (Step B5, Step B6, Step B7, and Step B8). The number of repeating times of update may be set to a predetermined number of times in advance or, the number of repeating times of update may be set based on a user's input.

In step B8, when judged that the change is not performed (NO in Step B8), the restoration unit 330 outputs the latest tentative restored image as the restored image (Step B9).

In addition, when the number of update times is equal to a predetermined number of times, the restoration unit 330 may output the latest tentative restored image as the restored image (Step B9).

The above is the explanation of the operation of the image processing device 300.

As explained above, because the image processing system 1000 according to the first exemplary embodiment can have similar effects in the case considering the adjacent similarity of the restoration patch in addition to the similarity of the blurred patch. Therefore, it can generate the highly accurate restored image with reducing the calculation cost.

The reasons are as follows. The image processing system 1000 selects a more similar patch again based on the similarity with the restoration patch to the restored image generated tentatively. Based on this operation, the image processing system 1000 can have same effects in the case considering the adjacent similarity of the restoration patch.

Alternatively, the calculation cost of the process for calculating the similarity with the restoration patch is less than that of the process for calculating the adjacent similarity of the restoration patch.

<Second Exemplary Embodiment>

Figure 11:
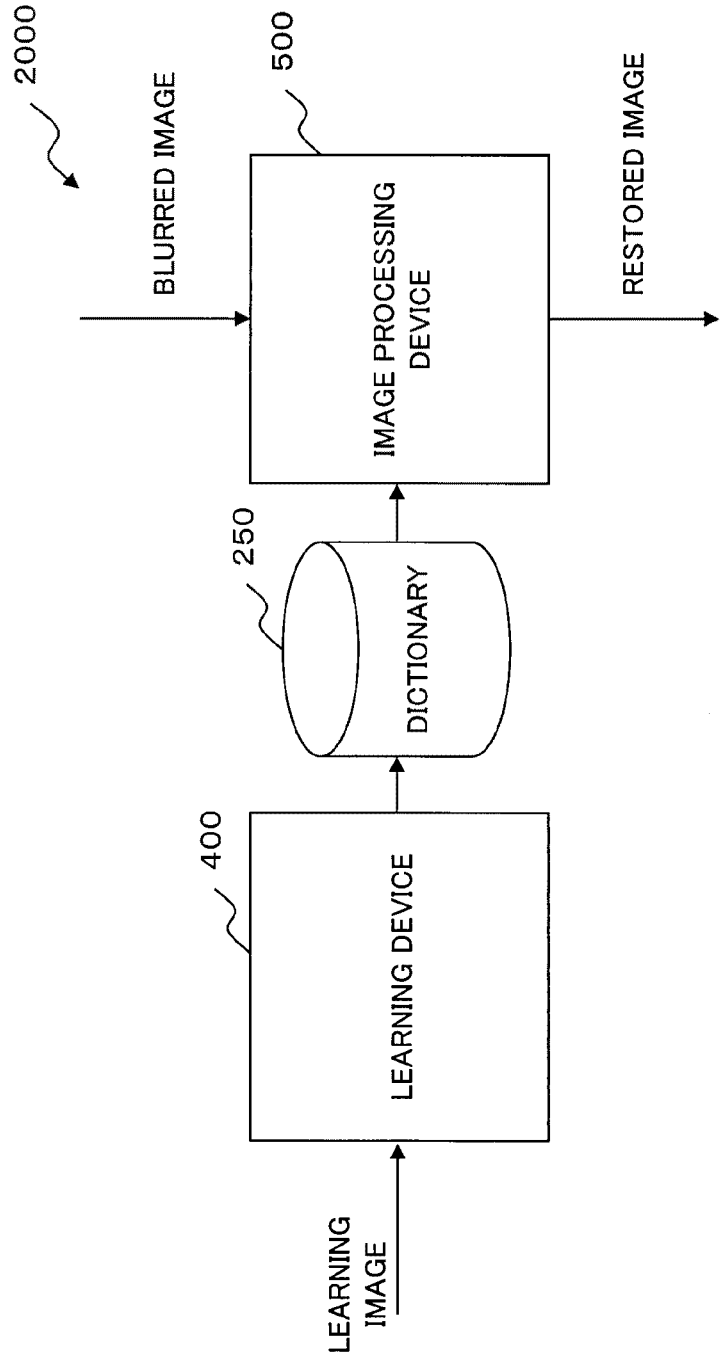
FIG. 11 is a block diagram showing an example of a configuration of an image processing system according to a second exemplary embodiment of the present invention.

FIG. 11 is a block diagram showing an example of a configuration of an image processing system 2000 according to a second exemplary embodiment of the present invention.

As shown in FIG. 11, the image processing system 2000 according to the second exemplary embodiment includes a learning device 400, a dictionary 250, and an image processing device 500.

The learning device 400 performs the learning phase in a mode including the blur parameter of the learning image unlike the learning device 100.

The dictionary 250 further stores the blur parameter unlike the dictionary 200.

The image processing device 500 performs the restoration phase by considering the similarity of the blur parameter unlike the image processing device 300.

Hereinafter, a difference between the first exemplary embodiment and the second exemplary embodiment will be described by dividing the learning phase and the restoration phase. In addition, the same reference numbers are assigned for the elements having the same function as the first exemplary embodiment and the explanation will be omitted.

(Learning Phase)

The learning phase according to the second exemplary embodiment of the present invention will be described with reference to FIGS. 12 to 15.

Figure 12:
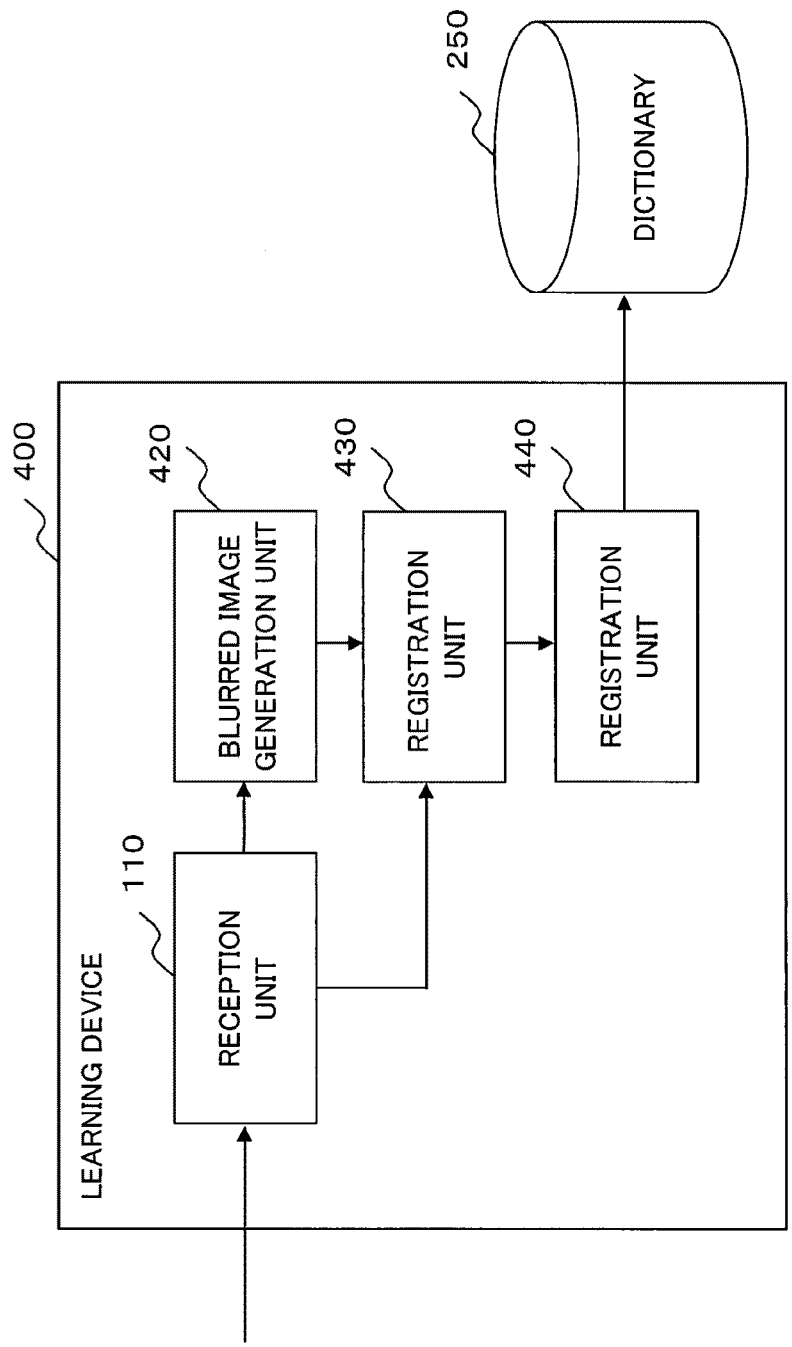
FIG. 12 is a block diagram showing an example of a configuration of a learning device according to the second exemplary embodiment of the present invention.

FIG. 12 is a block diagram showing an example of a configuration of the learning device 400.

As shown in FIG. 12, the learning device 400 includes the reception unit 110, a blurred image generation unit 420, a patch pair generation unit 430 and a registration unit 440. The learning device 400 performs the learning phase and makes the dictionary 250.

The blurred image generation unit 420 performs one or more blurring processes to the learning image outputted from the reception unit 110, and generates one or more blurred images. The blurred image generation unit 420 may perform plural different blurring processes to the learning image, and generate plural blurred images. The blurred image generation unit 420 may blur the learning image by using the various conventional methods. The blurring process may be a process in which a scale factor of the image, a degree of blur or a change of posture or lightness.

For example, the blurred image generation unit 420 may reduce the inputted learning image to one N-th of its size, and generate the blurred image. When reducing the learning image to one N-th of its size, it depends on a size reduction technology which pixel remains.

For example, the blurred image generation unit 420 may generate the blurred image by eliminating the high frequency component of the learning image for increasing the degree of blur.

Alternatively, the blurred image generation unit 420 may generate the blurred image based on a posture change in which the learning image is tilted. Specifically, for example, the blurred image generation unit 420 may change the posture of the learning image by performing a process in which the learning image arranged on an xy coordinate system is tilted or rotated about the axis, and generate the blurred image.

Alternatively, the blurred image generation unit 420 may change lightness by increasing or decreasing the brightness value of the learning image, and generate the blurred image.

The blurred image generation unit 420 outputs one or over blurred images generated from the learning image to the patch pair generation unit 430 together with the blur parameter indicating a blurred status of the image. Here, the blur parameter may be a parameter which represents a numerical value of a scaling factor of the image, a degree of blur, a change of posture or lightness for each area of the image.

The patch pair generation unit 430 is supplied the leaning image from the reception unit 110 and one or over blurred images and the blur parameter of each blurred image from the blurred image generation unit 420. The patch pair generation unit 430 generates plural patch pairs by using a same process of the patch pair generation unit 130. The patch pair generation unit 430 make plural generated patch pairs include the blur parameter of the blurred patch, and outputs them to the registration unit 440.

The registration unit 440 registers the plural patch pairs including the blur parameter corresponding to the blurred patch in the dictionary 250.

The dictionary 250 stores the plural patch pairs which include the blur parameter corresponding to the blurred patch and are generated by the learning device 400.

Figure 13:
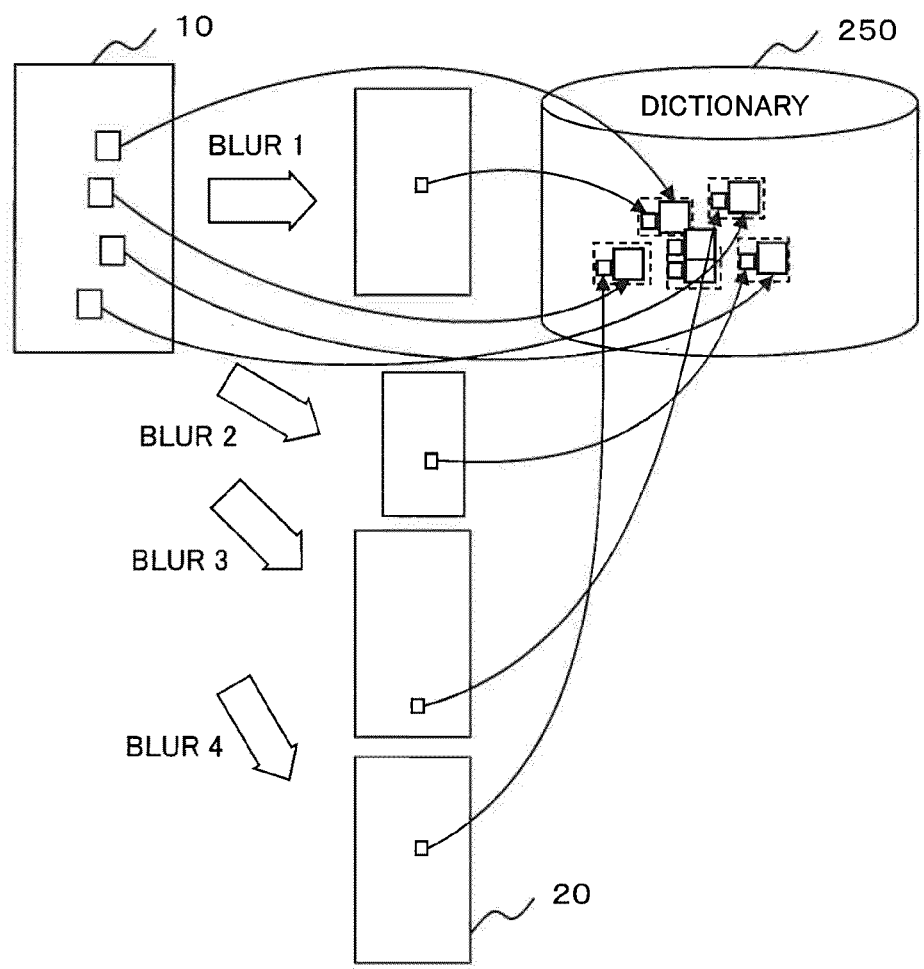
FIG. 13 is a conceptual diagram for explaining a learning phase according to the second exemplary embodiment.

FIG. 13 is a conceptual diagram for explaining the learning phase according to the second exemplary embodiment.

As shown in FIG. 13, the learning device 400 generates the blurred image 20 of various variations from the learning image 10, and registers the patch pair in the dictionary 250. In FIG. 13, blur 1, blur 2, blur 3 and blur 4 represent variation of the blurring processes.

Figure 14:
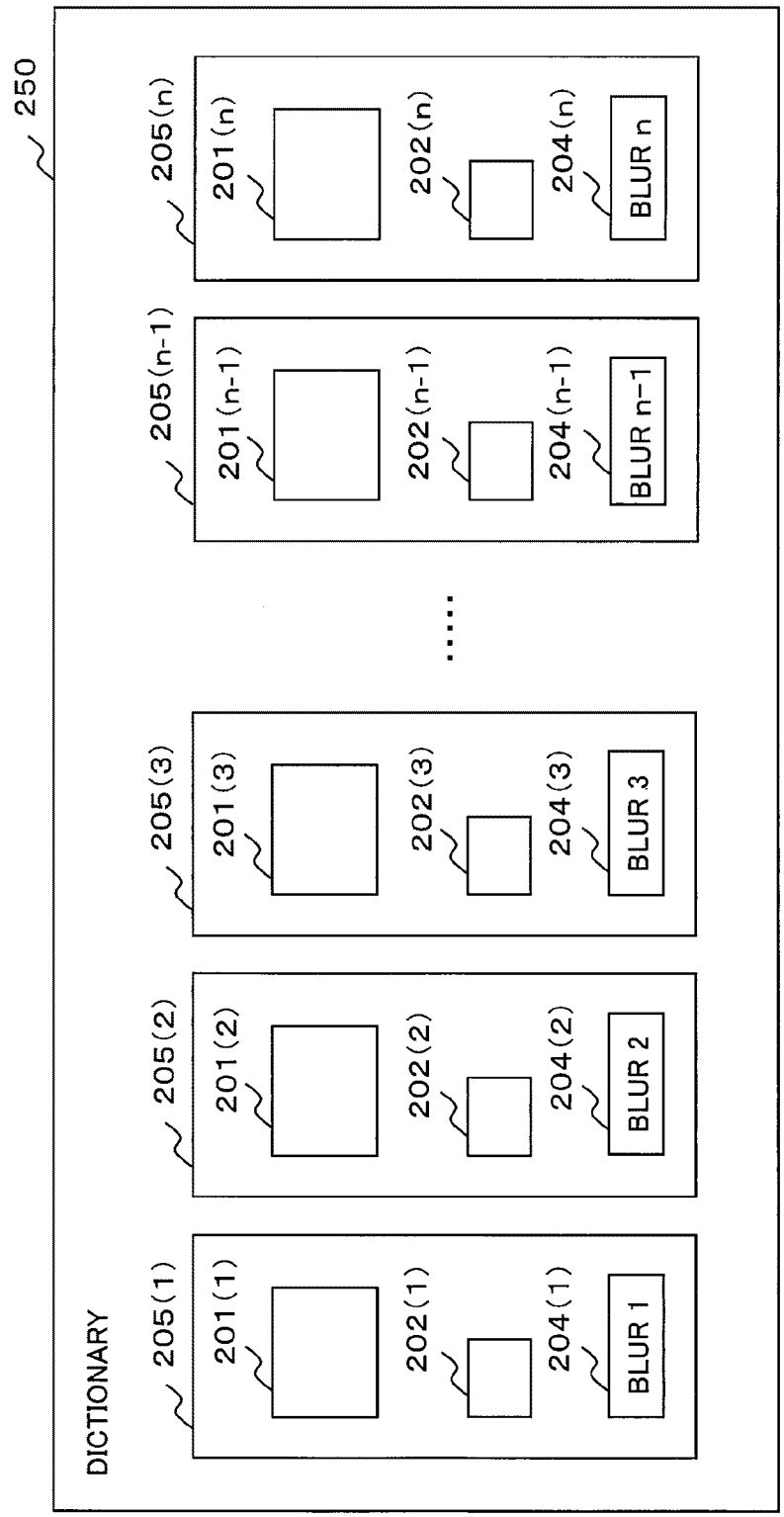
FIG. 14 is a conceptual diagram for explaining a state in which a dictionary according to the second exemplary embodiment stores plural patch pairs including a blur parameter.

FIG. 14 is a conceptual diagram for explaining a state in which the dictionary 250 stores the plural patch pairs including the blur parameter. As shown in FIG. 14, the dictionary 250 stores the blur parameters 204(1), 204(2), 204(3), ..., 204(n−1) and 204(n) other than the contents stored in the dictionary 200. The dictionary 250 stores the patch pairs 205(1), 205(2), 205(3), ..., 205(n−1), and 205(n) including the blur parameter. Here, n is a natural number.

Figure 15:
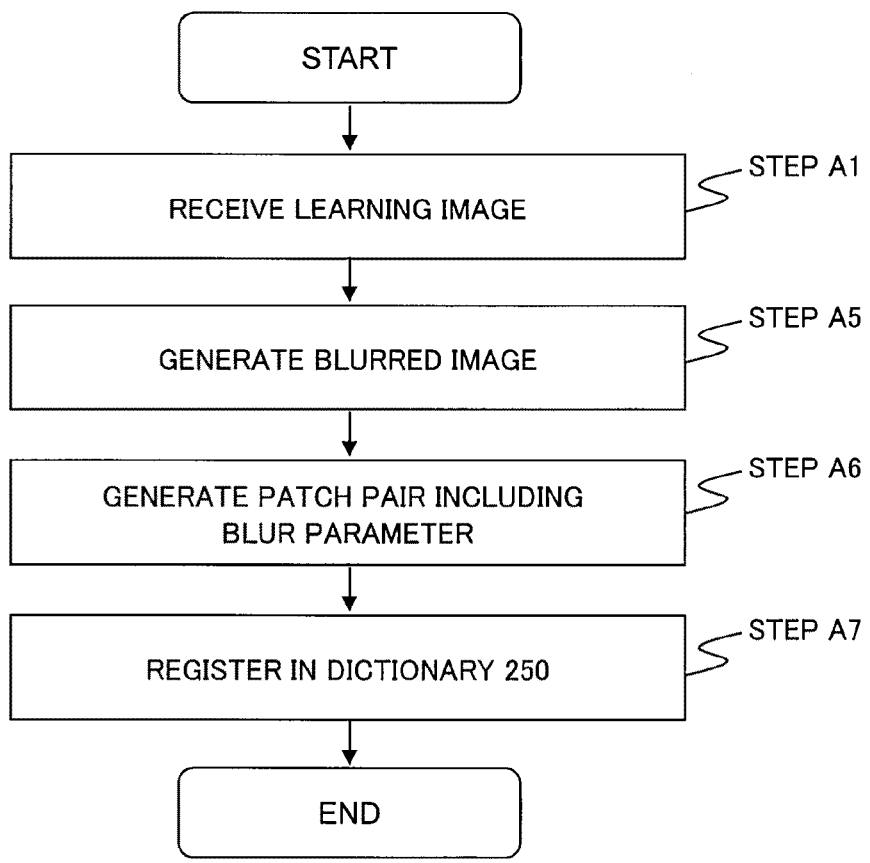
FIG. 15 is a flowchart showing an example of operation of the learning device.

FIG. 15 is a flowchart showing an example of the operation of the learning device.400.

As shown in FIG. 15, after Step A1, the blurred image generation unit 420 performs one or over blurring processes to the learning image outputted from the reception unit 110, and generates one or over blurred images (Step A5).

The patch pair generation unit 430 generates the plural patch pairs including the blur parameter, and outputs them to the registration unit 440 (Step A6).

The registration unit 440 registers the plural patch pairs including the blur parameter in the dictionary 250 (Step A7).

As described above, the dictionary 250 is generated based on the learning phase.

(Restoration Phase)

The restoration phase in the second exemplary embodiment of the present invention will be described with reference to FIGS. 16 to 19.

Figure 16:
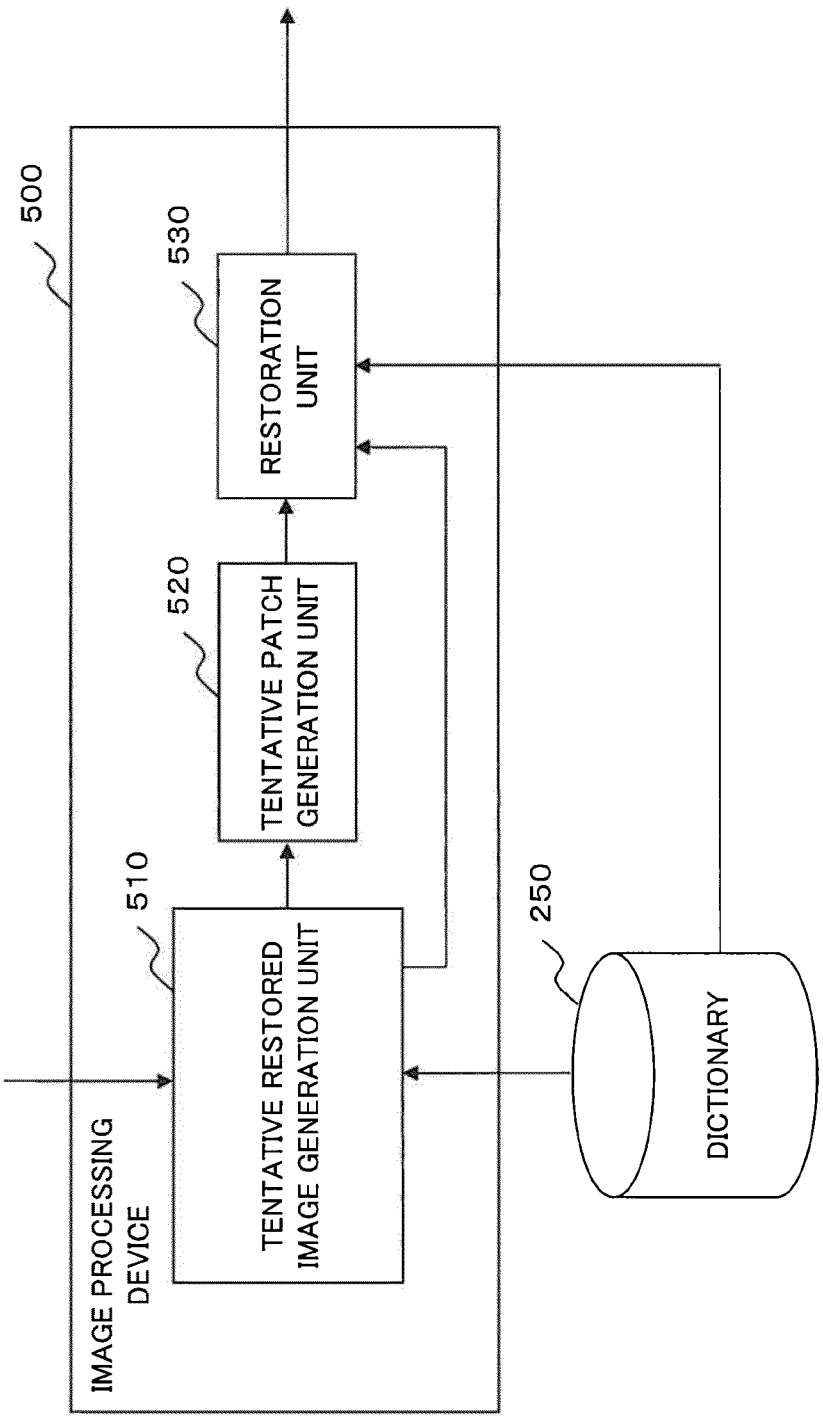
FIG. 16 is a block diagram showing an example of a configuration of an image processing device according to the second exemplary embodiment.

FIG. 16 is a block diagram showing an example of the configuration of the image processing device 500.

As shown in FIG. 16, the image processing device 500 includes a tentative restored image generation unit 510, a tentative patch generation unit 520, and a restoration unit 530. The image processing device 500 performs the restoration phase by considering the similarity of the blur parameter by using the dictionary 250.

The tentative restored image generation unit 510 generates the tentative restored image including the blur parameter as an image by using the information on the blur parameter of the blurred patch stored in the dictionary 250.

Figure 17:
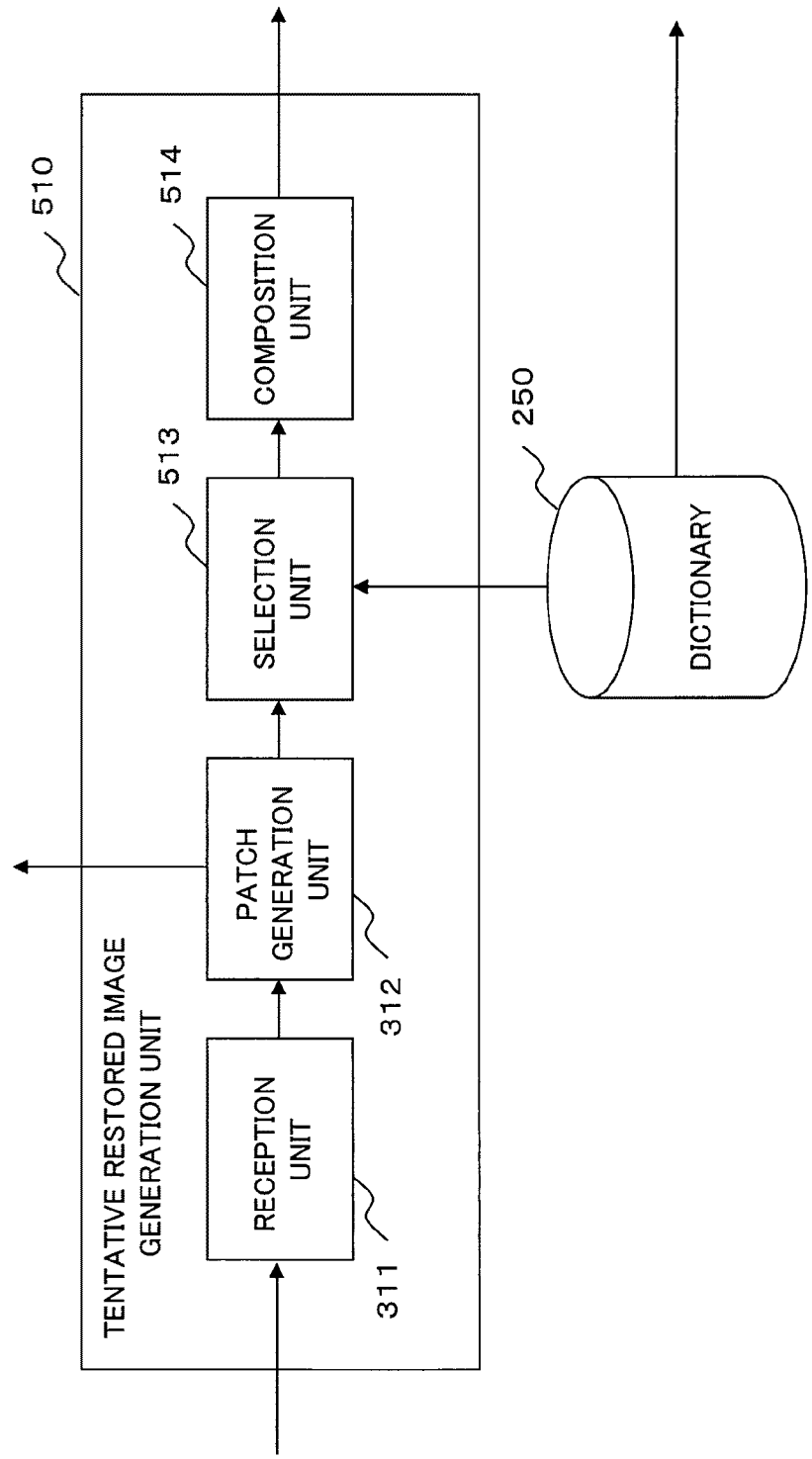
FIG. 17 is a block diagram showing an example of a detailed configuration of a tentative restored image generation unit according to the second exemplary embodiment.

FIG. 17 is a block diagram showing an example of a detailed configuration of the tentative restored image generation unit 510.

As shown in FIG. 17, the tentative restored image generation unit 510 includes the reception unit 311, the patch generation unit 312, a selection unit 513 and a composition unit 514. The tentative restored image generation unit 510 generates the tentative restored image including the blur parameter by using the dictionary 250.

The selection unit 513 receives plural input patches from the patch generation unit 312. The selection unit 513 selects the restoration patch and the corresponding blur parameter for each input patch from the data of the patch pair stored in the dictionary 250 based on the blur similarity value. The selection unit 513 outputs the plural restoration patches and the corresponding blur parameters which are selected to the composition unit 514.

The composition unit 514 composes the plural restoration patches outputted from the selection unit 513, and generates the tentative restored image. At this time, the composition unit 514 composes the plural blur parameters corresponding to each restoration patch, and generates the tentative restored image having the blur parameter.

The configuration of the image processing device 500 shown in FIG. 16 will be described further.

The tentative restored image generation unit 510 outputs the tentative restored image having the generated blur parameter to the tentative patch generation unit 520.

The tentative patch generation unit 520 divides the tentative restored image outputted from the tentative restored image generation unit 510 into blocks, and generates plural tentative patches having the blur parameter. The tentative patch generation unit 520 outputs the tentative patch having the blur parameter to the restoration unit 530.

The restoration unit 530 newly selects the restoration patch again based on a value (hereinafter, referred to as a "blur parameter similarity value") which indicates the similarity between the blur parameter of the tentative patch and the blur parameter of the blurred patch in the dictionary 250 in addition to the blur similarity value and the restoration similarity value. Namely, the restoration unit 530 newly selects the restoration patch again based on the sum of the blur similarity value, the restoration similarity value and the blur parameter similarity value, and updates the tentative restored image by using the restoration patch which is selected again. In addition, at this time, the restoration unit 530 updates the tentative restored image in a mode including the blur parameter.

For example, a method for calculating the blur parameter similarity value may be the following method.

For example, it is assumed that the blur parameter of each patch is constructed as a parameter group which has plural blur parameters (a scaling factor, lightness and the like) as a vector. In this case, the value indicating the similarity of the blur parameters between two patches may be a value based on a difference of the blur parameters between patches.

For example, the value indicating the similarity of the blur parameter between two patches may be a value calculated as follows.

First, the restoration unit 530 calculates the absolute value of the difference of the blur parameters between the patches. Next, the restoration unit 530 substitutes the absolute value of the difference of the parameter for a function which becomes a nonzero value when the value is equal to or greater than a constant value. Lastly, the restoration unit 530 should assume the sum of the function values calculated for each blur parameter as the similarity. For example, the restoration unit 530 may use a sigmoid function which makes the difference of the blur parameters between the patches an argument as the function which becomes a nonzero value when the value is equal to or greater than a constant value.

Alternatively, the value indicating the similarity of the blur parameter between two patches may be a value calculated by using a same method as a value calculating the similarity between patches explained by using FIG. 9 in the first exemplary embodiment.

For example, the value indicating the similarity of the blur parameters between two patches may be a value based on the difference of the blur parameters between the patches. Alternatively, the value indicating the similarity of the blur parameters between two patches may be a value based on the SSD which is a sum of squares of the differences of the blur parameters between the patches. Alternatively, the value indicating the similarity of the blur parameters between two patches may be a value based on the SAD which is an absolute value sum of the differences of the blur parameters between the patches. Alternatively, the value indicating the similarity of the blur parameters between two patches may be an angle between two vectors indicating two blur parameters. Alternatively, the value indicating the similarity of the blur parameters between two patches may be a value calculated based on the normalized cross-correlation function. However, the value indicating the similarity of the blur parameters between two patches is not limited to these values. Alternatively, the similarity may be a value calculated based on a brightness gradient of the patch. Alternatively, the similarity may use a value calculated from a distance of the histogram after making a value of brightness or a value of the brightness gradient a histogram.

The restoration unit 530 repeats the update of the tentative restored image based on the sum of the blur similarity value, the restoration similarity value and the blur parameter similarity value, and outputs the tentative restored image as the restored image when a change of the tentative restored image does not disappear.

Alternatively, the restoration unit 530 may output the tentative restored image in the stage when the update of the tentative restored image based on the sum of the blur similarity value, the restoration similarity value and the blur parameter similarity value is repeated by the predetermined number of times to outside as the restored image.

Figure 18:
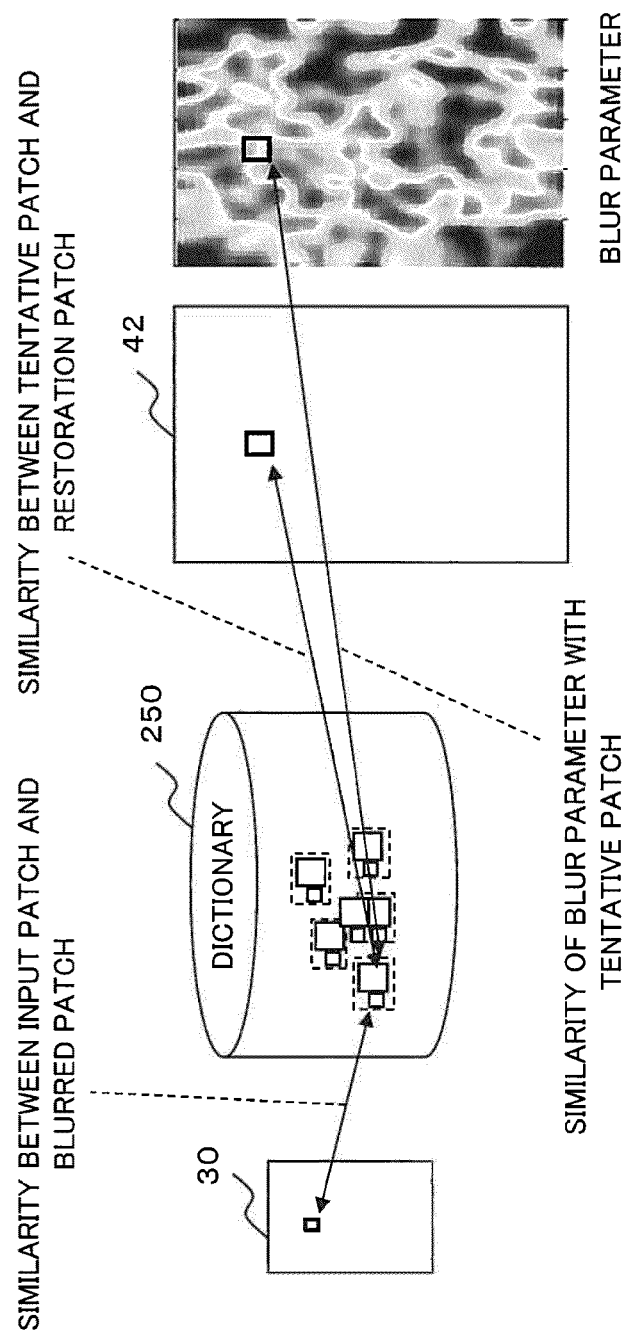
FIG. 18 is a conceptual diagram for explaining a restoration phase according to the second exemplary embodiment.

FIG. 18 is a conceptual diagram for explaining the restoration phase according to the second exemplary embodiment.

FIG. 18 separately shows an image represented by the blur parameter about the tentative restored image 42. As shown in FIG. 18, the image processing device 500 selects the restoration patch by considering the similarity between the tentative patch of the tentative restored image 42 and the restoration patch in the dictionary 200 and the similarity of the blur parameters in addition to the similarity between the input patch of the input image 30 and the blurred patch in the dictionary 200.

Figure 19:
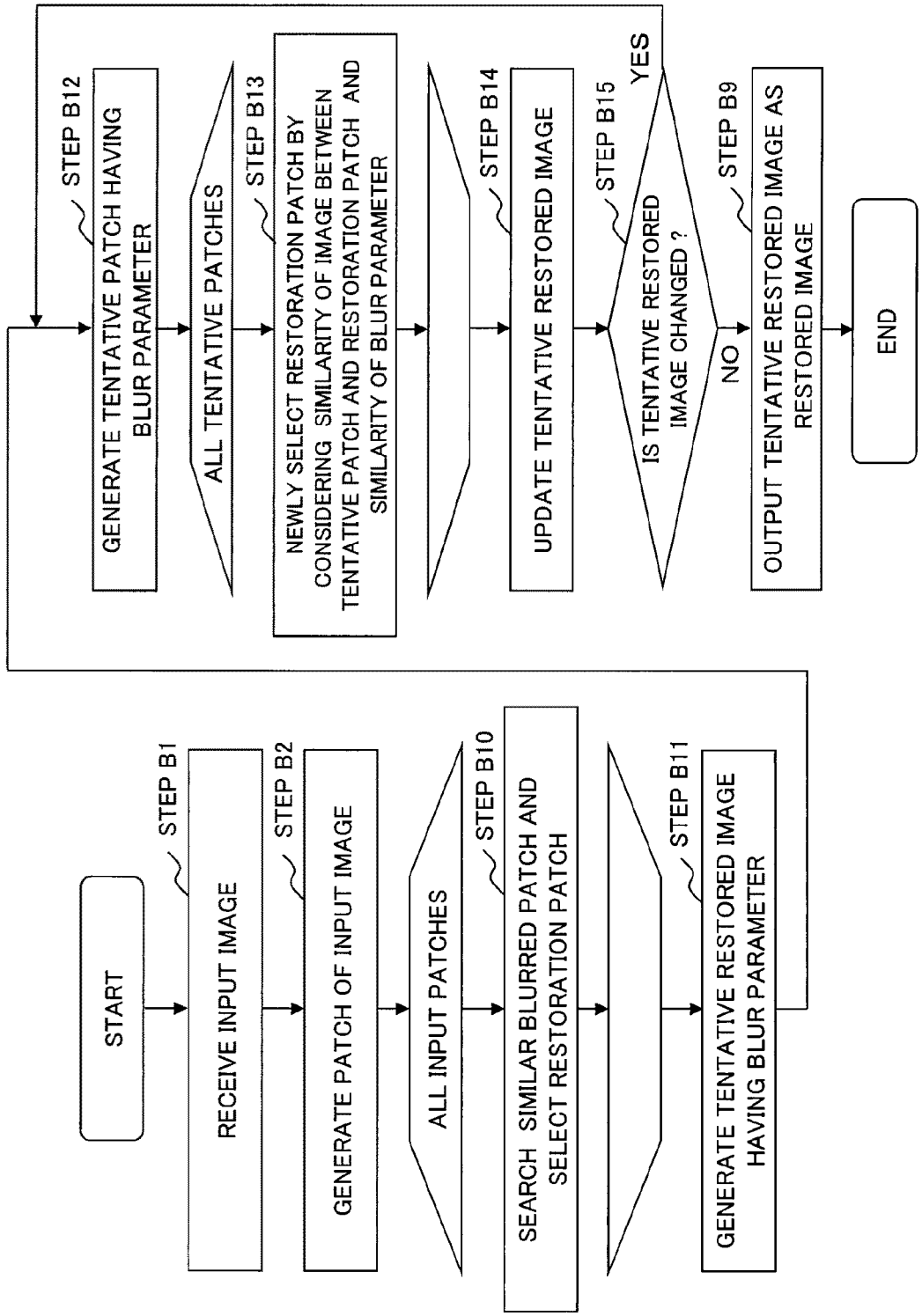
FIG. 19 is a flowchart showing an example of operation of the image processing device.

FIG. 19 is a flowchart showing an example of the operation of the image processing device 500.

As shown in FIG. 19, after Step B1 and Step B2, the selection unit 513 searches the blurred patch which is most similar to the input patch based on the blur similarity value, and selects the restoration patch paired with the most similar blurred patch and the blur parameter (Step B10). Step B10 is repeated for all the input patches.

The composition unit 514 composes the plural restoration patches and the blur parameter which are outputted from the selection unit 513, and generates the tentative restored image having the blur parameter (Step B11).

The tentative patch generation unit 520 divides the tentative restored image which includes the blur parameter and is outputted from the tentative restored image generation unit 510 into blocks, and generates plural tentative patches having the blur parameter (Step B12).

The restoration unit 530 newly selects the restoration patch again based on the sum of the blur similarity value, the restoration similarity value and the blur parameter similarity value (Step B13). In other words, the restoration unit 530 selects the restoration patch which is considered as the more appropriate restored image again by considering the restoration similarity and the similarity of the blur parameter again to the tentative restored image generated by considering the blur similarity. The process of Step B13 is repeated to all the tentative patches.

In addition, the restoration unit 530 does not update with the area where the same restoration patch is selected by considering the restoration similarity value and the blur parameter similarity value.

The restoration unit 530 newly selects the restoration patch again, and generates (updates) the tentative restored image having the blur parameter by using the restoration patch which is selected again (Step B14).

The restoration unit 530 judges whether or not the tentative restored image is changed based on the process for selecting the restoration patch from the tentative patch newly. At this time, the restoration unit 530 may judge whether or not the blur parameter of the tentative restored image is changed (Step B15).

When judged that the change is performed, the restoration unit 530 newly generates the tentative patch, and repeats the process for updating the tentative restored image (Step B12, Step B13, Step B14 and Step B15).

Alternatively, the restoration unit 530 may judge the number of update times of the tentative restored image based on the process for selecting the restoration patch from the tentative patch newly (Step B15). In the judgment of the number of update times, when the number of update times is equal to or less than a predetermined number of times, the restoration unit 530 may newly generate the tentative patch, and repeat the process for updating the tentative restored image (Step B12, Step B13, Step B14 and Step B15). The number of repeating times of update may be set to a predetermined number of times in advance. Alternatively, the number of repeating times of update may be set based on a user's input.

In Step B15, when judged that the change is not performed, the restoration unit 530 outputs the latest tentative restored image as the restored image (Step B9). Alternatively, in Step B15, when the number of update times is equal to a predetermined number of times, the restoration unit 530 may output the latest tentative restored image as the restored image (Step B9).

In Step B15, when judged that the change is not performed, the restoration unit 530 outputs the latest tentative restored image as the restored image (step B9).

As explained above, the image processing system 2000 according to the second exemplary embodiment can generate the more highly accurate restored image.

The reason is because the restoration patch is selected again by considering the similarity of the blur parameter in addition to the similarity between the tentative patch and the restoration patch at the time of update of the tentative restored image.

<Third Exemplary Embodiment>

A third exemplary embodiment of the present invention will be described with reference to FIGS. 20 to 22. The third exemplary embodiment of the present invention is difference from the first exemplary embodiment or the second exemplary embodiment in the point in which the image processing device 300 or the image processing device 500 is an image processing device 600.

Hereinafter, though an aspect which replaces the image processing device 300 according to the first exemplary embodiment with the image processing device 600 will be described, this exemplary embodiment is not limited to this aspect. This exemplary embodiment may replace the image processing device 500 according to the second exemplary embodiment with the image processing device 600.

Figure 20:
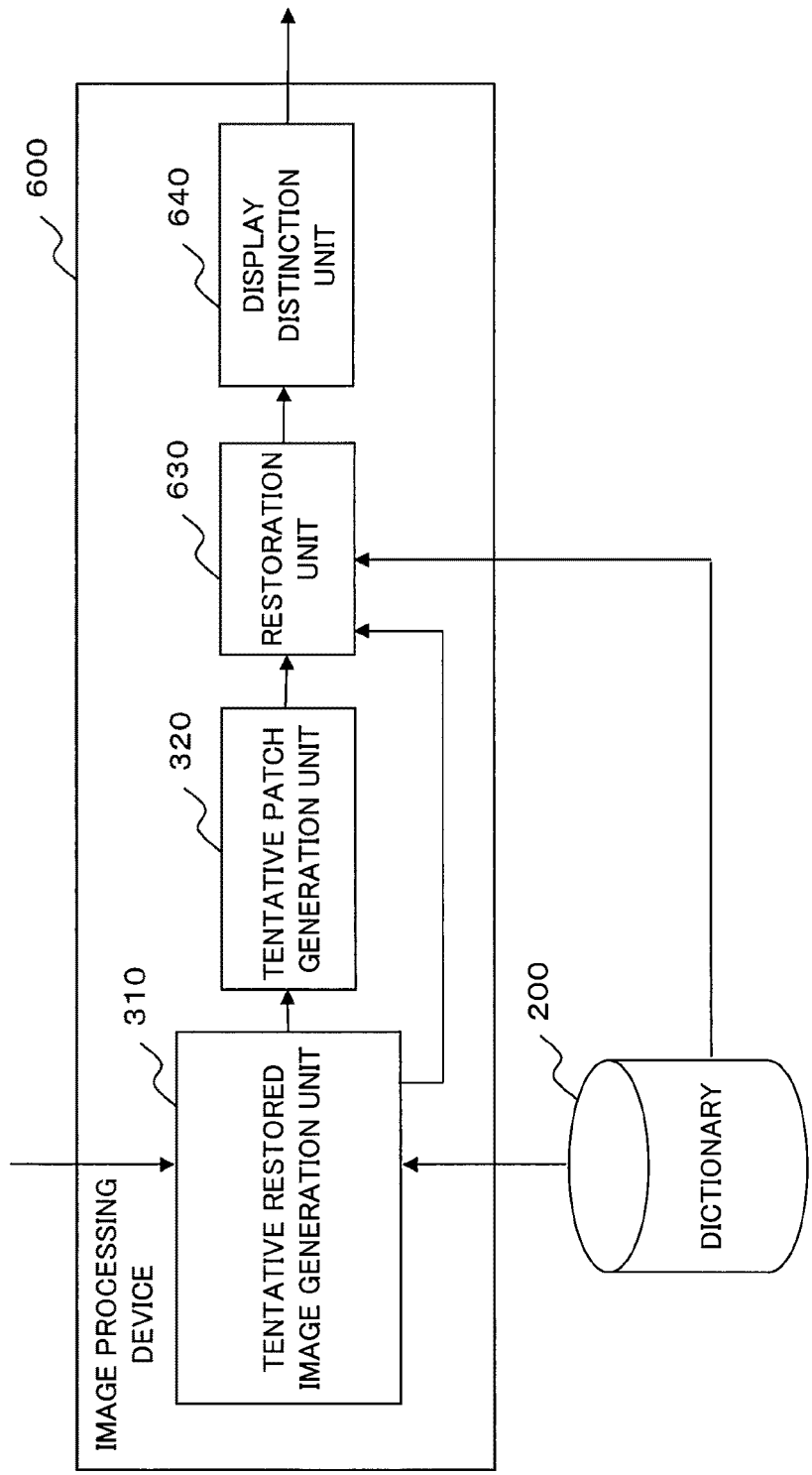
FIG. 20 is a block diagram showing an example of a configuration of an image processing device according to a third exemplary embodiment of the present invention.

FIG. 20 is a block diagram showing an example of the configuration of the image processing device 600 according to the third exemplary embodiment of the present invention.

As shown in FIG. 20, the image processing device 600 includes a restoration unit 630 instead of the restoration unit 330 and further includes a display distinction unit 640 compared with the image processing device 300 shown in FIG. 6.

The restoration unit 630 newly selects the restoration patch, and generates the restored image to an area where a value indicating the similarity between the tentative patch and the restoration patch is a value which indicates that the similarity between the tentative patch and the restoration patch is low. The restoration unit 630 outputs the generated restored image to the display distinction unit 640.

The display distinction unit 640 is supplied the restored image from the restoration unit 630. The display distinction unit 640 gives information (hereinafter, referred to as "distinction information") by which the area in which the value indicating the similarity between the tentative patch and the restoration patch is low can be distinguished from other areas to the restored image. The display distinction unit 640 outputs the restored image having the distinction information to outside.

Figure 21:
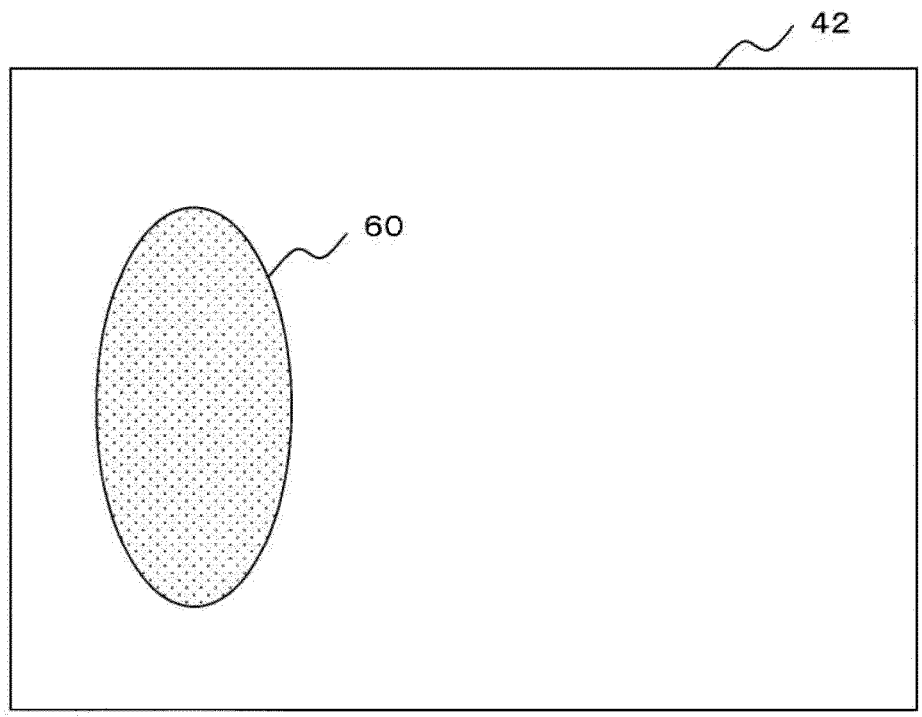
FIG. 21 is a figure for explaining details of a restoration unit and a display distinction unit according to the third exemplary embodiment.

FIG. 21 is a figure for explaining details of the restoration unit 630 and the display distinction unit 640.

FIG. 21 shows the area where the restoration similarity value is low in the tentative restored image 42. The low restoration similarity value means that a reliability of the restoration accuracy is low. Accordingly, hereinafter, the area where the restoration similarity value is low is called a "low reliance area 60".

The restoration unit 630 does not select the restoration patch again to all the tentative patches but selects the restoration patch again to the tentative patch included in a low reliability area 60.

First, the restoration unit 630 calculates a value indicating the similarity between the tentative patch and the restoration patch, namely the restoration similarity value, to all the tentative patches. When the restoration unit 630 calculates the restoration similarity values to all the tentative patches, it judges the area where the restoration similarity value is low. Specifically, the restoration unit 630 may judge the patch area in which the restoration similarity value is lower (or higher) than a predetermined threshold value as the low reliance area 60.

Next, the restoration unit 630 selects the restoration patch which is same one related to the restoration unit 330 again to the tentative patch included in the low reliance area 60 like the restoration unit 330. Namely, the restoration unit 630 newly selects the restoration patch again based on the sum of the blur similarity value and the restoration similarity value in the low reliance area 60, and updates the tentative restored image by using the restoration patch which is selected again.

The restoration unit 630 judges the low reliance area 60, and repeats the process for updating the tentative restored image based on the sum of the blur similarity value and the restoration similarity value. The restoration unit 630 outputs the tentative restored image to the display distinction unit 640 as the restored image when a change of the tentative restored image disappears.

Alternatively, the restoration unit 630 may output the tentative restored image to the display distinction unit 640 as the restored image when the number of update times of the tentative restored image is equal to a fixed number of times. The number of repeating times of update may be set a predetermined number of times in advance. Alternatively, the number of repeating times of update may be set based on a user's input.

The display distinction unit 640 gives the distinction information which can distinguish the low reliance area 60 from the area other than the low reliance area 60 in the restored image to the restored image. For example, as shown in FIG. 21, the distinction information may be information which indicates extent which is masked as the low reliance area 60 in the restored image. A method for distinguishing the low reliance area 60 from the other area is not limited to the above-mentioned masking method. The distinction information may be any information as, for example, information for processing display method in which the low reliance area 60 can be recognized when a user views an output unit of the display.

Figure 22:
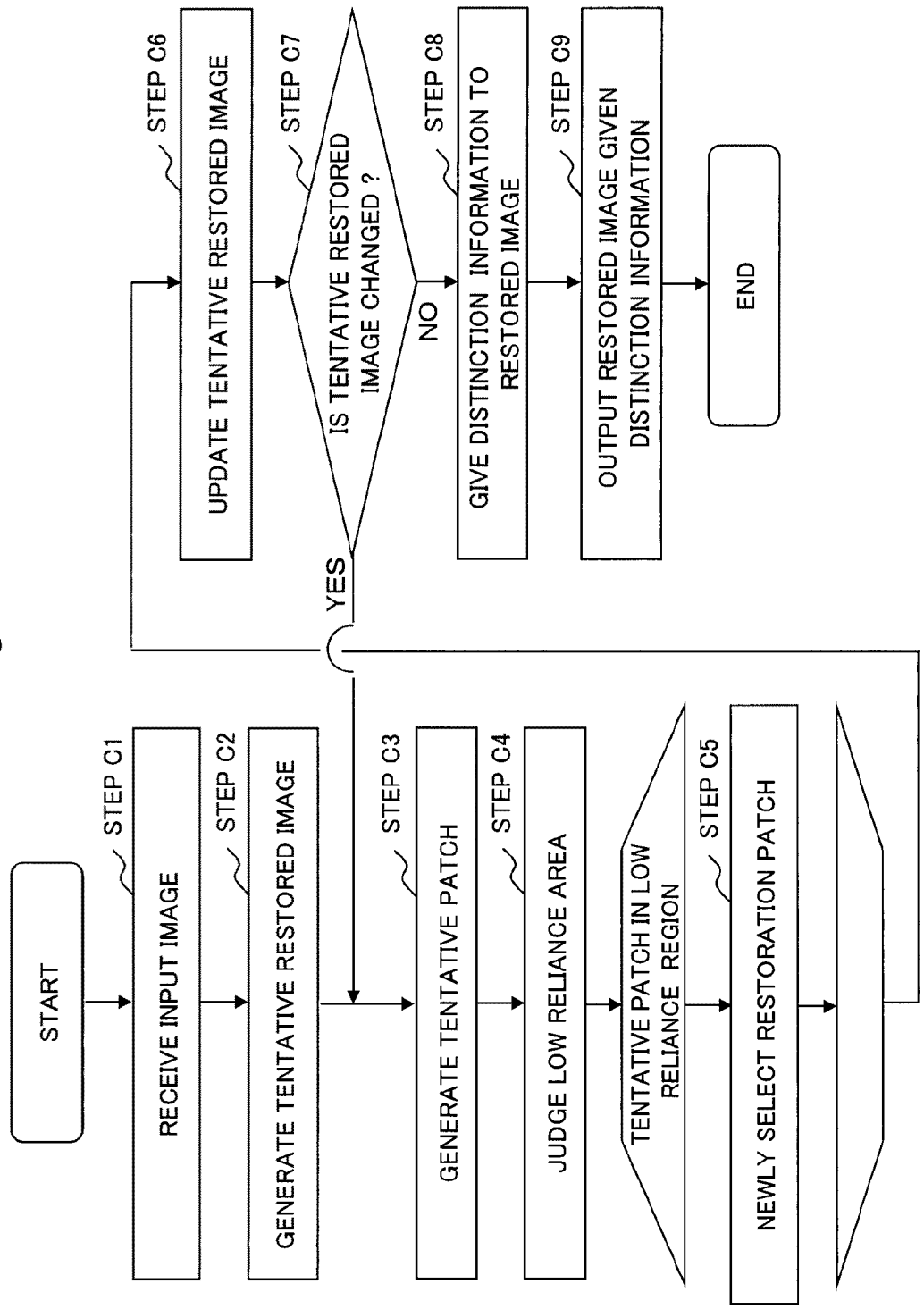
FIG. 22 is a flowchart showing an example of operation of the image processing device.

FIG. 22 is a flowchart showing an example of the operation of the image processing device 600.

As shown in FIG. 22, the tentative restored image generation unit 310 receives the input image from outside (Step C1).

The tentative restored image generation unit 310 generates the tentative restored image from the input image (Step C2). Specifically, the tentative restored image generation unit 310 may generate the tentative restored image like Step B2, Step B3, and Step B4 shown in FIG. 10.

The tentative patch generation unit 320 divides the tentative restored image into blocks, and generates plural tentative patches (Step C3).

The restoration unit 630 judges the low reliance area 60 in the tentative restored image (Step C4).

The restoration unit 630 selects the restoration patch again (Step C5). The restoration unit 630 repeats Step C5 to the tentative patch included in the low reliability area 60.

The restoration unit 630 updates the tentative restored image by using the restoration patch which is newly selected to the low reliance area 60 (Step C6).

The restoration unit 630 judges whether or not the tentative restored image is changed based on the newly selected restoration patch to the low reliance area 60 (Step C7). When judged that the change is performed, the restoration unit 630 newly generates the tentative patch, judges the low reliance area 60, and repeats the process for updating the tentative restored image (Step C3, Step C4, Step C5, Step C6 and Step C7).

Alternatively, the restoration unit 630 may judge the number of update times of the tentative restored image based on the newly selected restoration patch to the low reliance area 60 (Step C7). When the number of update times is equal to or less than a predetermined number of times, the restoration unit 630 may newly generate the tentative patch, and repeat the process for updating the tentative restored image to the low reliance area 60 (Step C3, Step C4, Step C5, Step C6 and Step C7). The number of repeating times of update may be set a predetermined number of times in advance. Alternatively, the number of repeating times of update may be set based on a user's input.

In Step C7, when judged that the change is not performed, the restoration unit 630 outputs the latest tentative restored image to the display distinction unit 640 as the restored image. Alternatively, in Step C7, when the number of update times is equal to a predetermined number of times, the restoration unit 630 may output the latest tentative restored image as the restored image.

The display distinction unit 640 gives the distinction information which can distinguish the low reliance area 60 from the area other than the low reliance area 60 in the restored image to the restored image (Step C8).

The display distinction unit 640 outputs the restored image given the distinction information (Step C9).

As described above, the image processing device 600 according to the third exemplary embodiment can suppress the calculation cost and efficiently generate the highly accurate restored image.

The reason is because the restoration unit 630 does not select the restoration patch again to all the tentative patches but selects the restoration patch in the only area where the reliability is low again.

And, the user can visually recognize the low reliability area as a degree of restoration of the image based on the image processing device 600 according to the third exemplary embodiment.

The reason is because the display distinction unit 640 gives the information which can distinguish the low reliability area from the other area to the restored image.

<Fourth Exemplary Embodiment>

Next, a functional configuration of an image processing device 700 according to a fourth exemplary embodiment of the present invention will be described with reference to FIG. 23 and FIG. 24.

Figure 23:
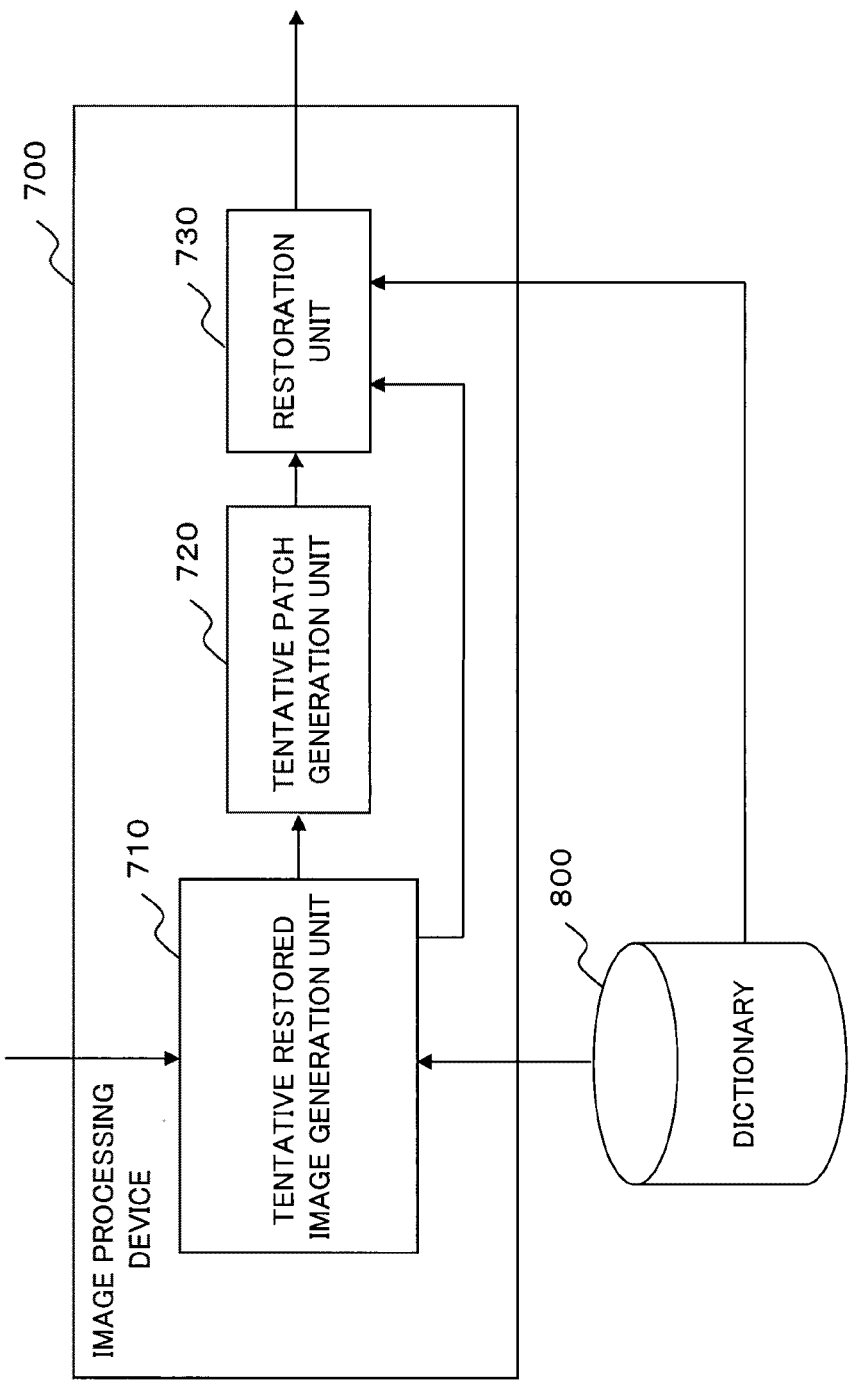
FIG. 23 is a block diagram showing an example of a configuration of an image processing device according to a fourth exemplary embodiment.

FIG. 23 is a block diagram showing an example of the configuration of the image processing device 700 according to the fourth exemplary embodiment.

As shown in FIG. 23, the image processing device 700 includes a tentative restored image generation unit 710, a tentative patch generation unit 720, and a restoration unit 730. The image processing device 700 generates the restored image from the inputted blurred image by using a dictionary 800. In addition, the tentative restored image generation unit 710, the tentative patch generation unit 720, the restoration unit 730 and the dictionary 800 may be the same component as the tentative restored image generation unit 310, the tentative patch generation unit 320, the restoration unit 330, and the dictionary 200 according to the first exemplary embodiment.

The dictionary 800 stores two or more data of sets associating the blurred patch which is the patch of the blurred image generated from the learning image with the restoration patch which is the patch of the learning image.

The tentative restored image generation unit 710 selects the restoration patch based on the value indicating the similarities between the plural input patches generated by dividing the input image from outside which and the blurred patch, and generates the tentative restored image based on the selected restoration patch.

The tentative patch generation unit 720 divides the tentative restored image, and generates the tentative patches.

The restoration unit 730 generates the restored image from the restoration patch selected based on the sum of the value indicating the similarity between the input patch and the blurred patch and the value indicating the similarity between the tentative patch and the restoration patch.

Figure 24:
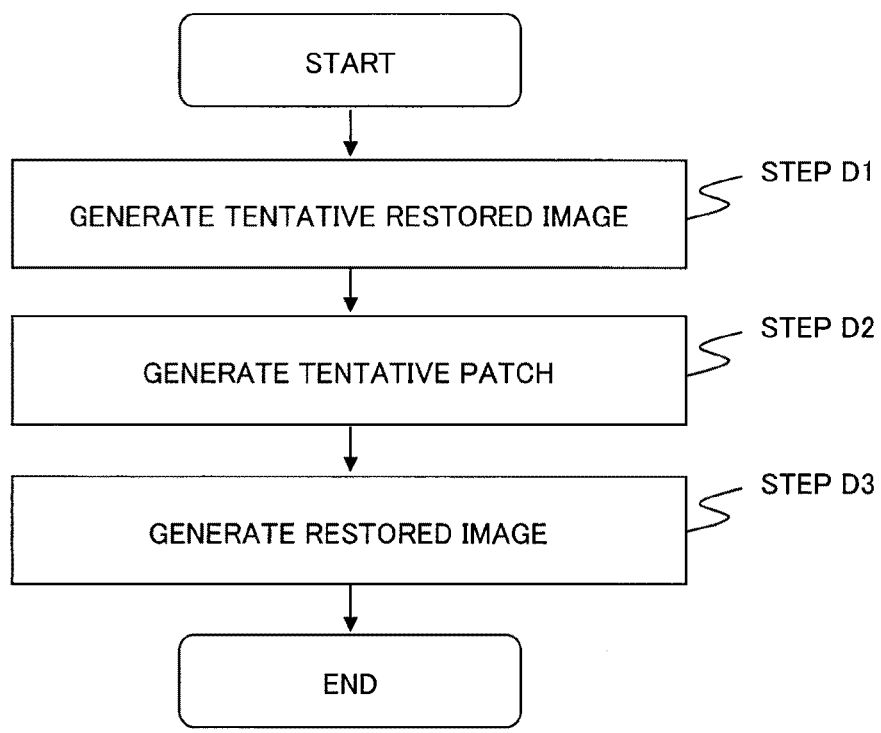
FIG. 24 is a flowchart showing an example of operation of the image processing device according to the fourth exemplary embodiment.

FIG. 24 is a flowchart showing an example of the operation of the image processing device 700 according to the fourth exemplary embodiment.

As shown in FIG. 24, the tentative restored image generation unit 710 generates the tentative restored image from the restoration patch selected based on the value indicating the similarities between the plural input patches generated by dividing the input image received from outside and the blurred patch (Step DO.

The tentative patch generation unit 720 divides the tentative restored image, and generates the tentative patch (Step D2).

The restoration unit 730 generates the restored image from the restoration patch selected based on the sum of the value indicating the similarity between the input patch and the blurred patch and the value indicating the similarity between the tentative patch and the restoration patch (Step D3).

As described above, because the image processing device 700 according to the fourth exemplary embodiment can have similar effects in the case considering the adjacent similarity of the restoration patch in addition to the similarity of the blurred patch, it can generate the highly accurate restored image with reducing the calculation cost.

Next, the component of the image processing device according to the present invention will be described for each hardware unit.

Figure 25:
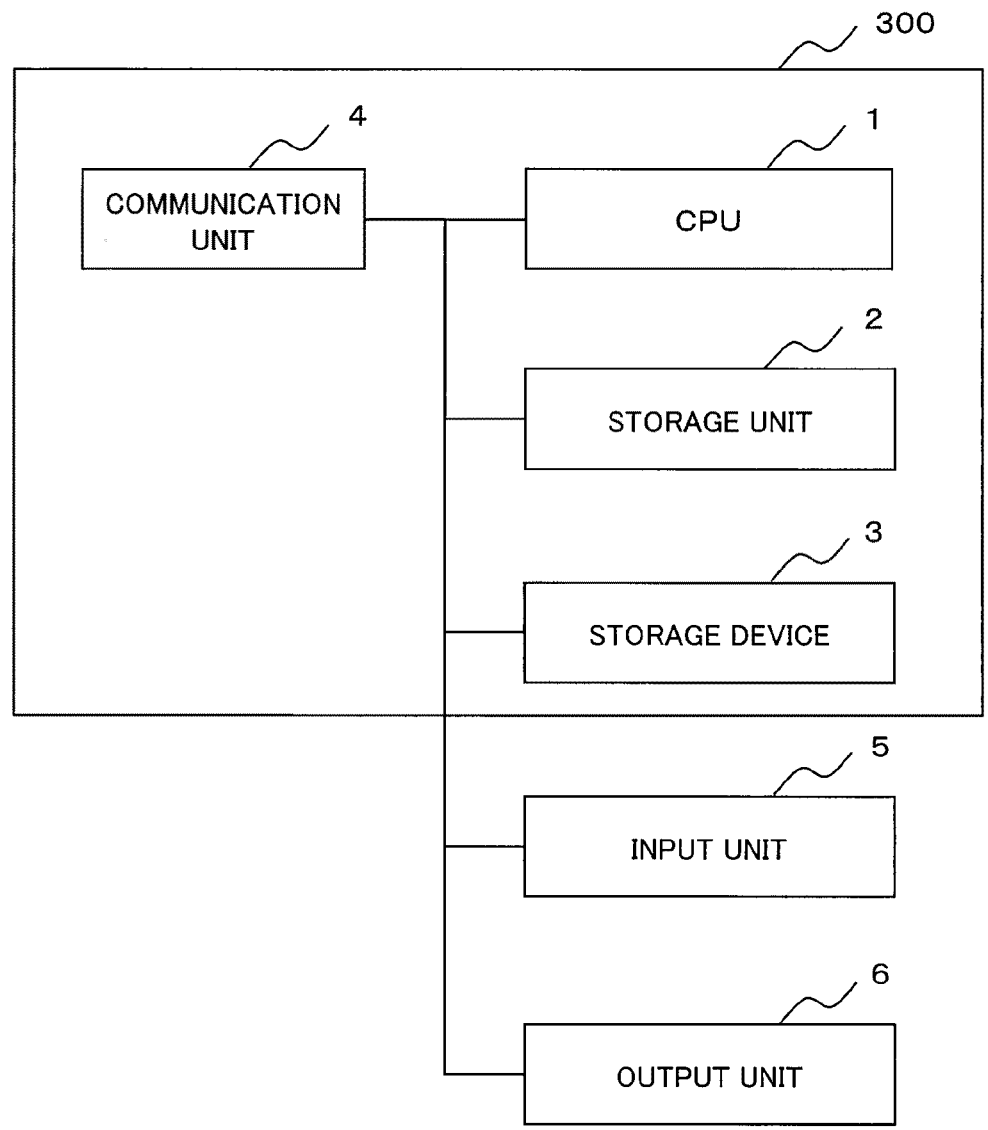
FIG. 25 is a block diagram showing an example of a hardware configuration of the image processing device according to the exemplary embodiment and its peripheral device.

FIG. 25 is a block diagram showing an example of a hardware configuration of the image processing device 300 according to the first exemplary embodiment and a peripheral device.

Here, though the image processing device 300 will be described as an example, the learning devices 100 and 400 and the image processing devices 500, 600 and 700 may be realized by using the hardware configuration shown in FIG. 25.

As shown in FIG. 25, the image processing device 300 includes a CPU (Central Processing Unit) 1, a storage unit 2, a storage device 3, and a communication unit 4. And, the image processing device 300 connects to an input unit 5 and an output unit 6.

The CPU 1 controls the entire operation of the image processing device 300 by operating an operating system (not shown). And, for example, the CPU 1 reads a program (for example, a program which causes a computer to execute the operation of the flowchart shown in FIG. 10) and data from a non-volatile recording medium (not shown) installed in the storage device 3, and writes the read program and data into the storage unit 2. Then, the CPU 1 executes the various processes as the tentative restored image generation unit 310, the tentative patch generation unit 320, and the restoration unit 330 shown in FIG. 6 based on the read program and data.

In addition, the CPU 1 may download the program and the data to the storage unit 2 from an external computer (not shown) connected to a communication network (not shown).

The storage unit 2 stores the program and the data.

The storage device 3 is, for example, an optical disc, a flexible disc, a magnetic optical disc, an external hard disk, or a semiconductor memory, and includes a non-volatile storage medium. The storage device 3 records the program in a computer-readable form. And, the storage device 3 may record the data in a computer-readable form.

The communication unit 4 realizes an interface between the network and the image processing device 300. For example, the image processing device 300 may be connected to the dictionary 200 via the communication unit 4.

The input unit 5 is realized by, for example, a mouse, a keyboard, and a built-in key button, and used for an input operation. The input unit 5 is not limited to the mouse, the keyboard and the built-in key button, but, for example, may be a touch panel, an accelerometer, a gyro sensor, and a camera.

The output unit 6 is realized by, for example, a display and used for confirming an output.

The above is the explanation about each component of hardware unit of the image processing device 300.

As explained above, the block of functional unit shown in FIG. 6 is realized by using a hardware configuration shown in FIG. 25. However, a realization of each unit included in the image processing device 300 is not limited to the above description. Namely, the image processing device 300 may be realized by using one device which is physically connected. Alternatively, the image processing device 300 may be realized by plural devices which are two or more devices physically separated and connected to each other by wire or wireless.

Alternatively, the recording medium (or the storage medium) recording the above-mentioned program may be supplied to the image processing device 300. Then, the image processing device 300 may read the program stored in the recording medium, and execute it. Namely, the exemplary embodiment of the present invention includes an exemplary embodiment of a recording medium which stores the program executed by the image processing device 300 in a temporary or non-temporary status.

The program of the present invention may be a program which causes a computer to perform each operation described in each exemplary embodiment mentioned above.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2011-271532, filed on Dec. 12, 2011, the disclosure of which is incorporated herein in its entirety by reference.

DESCRIPTION OF SYMBOL

1 CPU
2 storage unit
3 storage device
4 communication unit
5 input unit
6 output unit
10 learning image
20 blurred image
30 input image
31 input patch
42 tentative restored image
43 tentative patch
50 patch
51 pixels
52 pixel
60 low reliance area
100, 400 learning device
110 reception unit
120, 420 blurred image generation unit
130, 430 patch pair generation unit
140, 440 registration unit
200, 250, 800 dictionary
201 restoration patch
202 blurred patch
203, 205 patch pair
204 blur parameter
300, 500, 600, 700 image processing device
310, 510, 710 tentative restored image generation unit
311 reception unit
312 patch generation unit
313, 513 selection unit
314, 514 composition unit
320, 520, 720 tentative patch generation unit
330, 530, 630, 730 restoration unit
640 display distinction unit
1000, 2000 image processing system
W overlap area
X image
Y patch
Z pixel

The invention claimed is:

1. An image processing device, which uses a dictionary which stores data of two or over sets which associate a blurred patch which is a patch of a blurred image generated by blurring a predetermined image with a restoration patch which is a patch of the predetermined image; comprising:
   a memory storing instructions derived from a computer program; and a processor configured to process the instructions to:
　　generate a tentative restored image from the restoration patch selected based on values indicating similarities between plural input patches generated by dividing an inputted input image and the blurred patch;
　　generate a tentative patch by dividing the tentative restored image; and
　　generate a restored image from the restoration patch selected based on a sum of the value indicating the similarity between the input patch and the blurred patch and a value indicating the similarity between the tentative patch and the restoration patch.

2. The image processing device according to claim 1, wherein the processor is further configured to process the instructions to:
　　receive an image from outside;
　　generate plural input patches by dividing the received input image into blocks;
　　select the restoration patch for each input patch from the data of the sets stored in the dictionary based on values indicating the similarities of the images between the plural input patches and the blurred patch; and
　　generate the tentative restored image by composing the restoration patch for each selected input patch.

3. The image processing device according to claim 1, wherein the value indicating the similarity is a value calculated based on a difference of brightness value of each pixel between the patches.

4. The image processing device according to claim 1, wherein
　　the dictionary stores a blur parameter of the blurred patch together with the blurred patch and the restoration patch, and
　　the processor is further configured to process the instructions to generate the restored image from the restoration patch selected based on a sum of the value indicating the similarity between the input patch and the blurred patch, the value indicating the similarity between the tentative patch and the restoration patch, and a value indicating the similarity of the blur parameter between the tentative patch and the blurred patch.

5. The image processing device according to claim 1, wherein the processor is further configured to process the instructions to generate the restoration image by selecting the restoration patch regarding an area in which the value indicating the similarity between the tentative patch and the restoration patch is a value which indicates lower similarity between the tentative patch and the restoration patch.

6. The image processing device according to claim 5, wherein the processor is further configured to process the instructions to distinguish an area in which the value indicating the similarity between the tentative patch and the restoration patch is a value which indicates that a similarity between the tentative patch and the restoration patch is low from areas other than the area, and display it.

7. An image processing method comprising:
　　storing data of two or over sets which associate a blurred patch which is a patch generated by blurring a predetermined image with a restoration patch which is a patch of the predetermined image;
　　generating a tentative restored image from the restoration patch selected based on values indicating similarities between plural input patches generated by dividing an inputted input image and the blurred patch;
　　generating a tentative patch by dividing the tentative restored image; and
　　generating a restored image from the restoration patch selected based on a sum of the value indicating the similarity between the input patch and the blurred patch and a value indicating the similarity between the tentative patch and the restoration patch.

8. A non transitory computer readable medium embodying a program, said program causing an image processing device to perform a method, said method comprising:
　　storing data of two or over sets which associates a blurred patch which is a patch generated by blurring a predetermined image with a restoration patch which is a patch of the predetermined image;
　　generating a tentative restored image from the restoration patch selected based on values indicating a similarities between plural input patches generated by dividing an inputted input image and the blurred patch;
　　generating a tentative patch by dividing the tentative restored image; and
　　generating a restored image from the restoration patch selected based on a sum of the value indicating the similarity between the input patch and the blurred patch and a value indicating the similarity between the tentative patch and the restoration patch.

9. An image processing device, which uses a dictionary storing data of two or over sets which associate a blurred patch which is a patch of a blurred image generated by blurring a predetermined image with a restoration patch which is a patch of the predetermined image; comprising:
　　tentative restored image generation means for generating a tentative restored image from the restoration patch selected based on values indicating similarities between plural input patches generated by dividing an inputted input image and the blurred patch;
　　tentative patch generation means for generating a tentative patch by dividing the tentative restored image; and
　　restoration means for generating a restored image from the restoration patch selected based on a sum of the value indicating the similarity between the input patch and the blurred patch and a value indicating the similarity between the tentative patch and the restoration patch.

* * * * *